(12) United States Patent
Kraft et al.

(10) Patent No.: US 10,255,523 B2
(45) Date of Patent: Apr. 9, 2019

(54) MOVING VEHICLE DETECTION AND ANALYSIS USING LOW RESOLUTION REMOTE SENSING IMAGERY

(71) Applicant: Orbital Insight, Inc., Palo Alto, CA (US)

(72) Inventors: Adam Wiggen Kraft, Mountain View, CA (US); Boris Aleksandrovich Babenko, Mountain View, CA (US); Michael Alan Baxter, Sunnyvale, CA (US); Steven Jeffrey Bickerton, Redwood City, CA (US)

(73) Assignee: ORBITAL INSIGHT, INC., Palo Alto, CA (US)

( * ) Notice: Subject to any disclaimer, the term of this patent is extended or adjusted under 35 U.S.C. 154(b) by 0 days.

(21) Appl. No.: 15/351,373

(22) Filed: Nov. 14, 2016

(65) Prior Publication Data

US 2017/0140245 A1    May 18, 2017

Related U.S. Application Data

(60) Provisional application No. 62/256,072, filed on Nov. 16, 2015.

(51) Int. Cl.
| | |
|---|---|
| *G06K 9/00* | (2006.01) |
| *G06K 9/34* | (2006.01) |
| *G06K 9/46* | (2006.01) |
| *G06K 9/62* | (2006.01) |

(52) U.S. Cl.
CPC ......... *G06K 9/6218* (2013.01); *G06K 9/0063* (2013.01); *G06K 9/00785* (2013.01); *G06K 9/342* (2013.01); *G06K 9/4671* (2013.01); *G06K 9/6234* (2013.01); *G06K 9/6256* (2013.01)

(58) Field of Classification Search
None
See application file for complete search history.

(56) References Cited

U.S. PATENT DOCUMENTS

| | | |
|---|---|---|
| 5,809,161 A | 9/1998 | Auty et al. |
| 7,000,200 B1 * | 2/2006 | Martins .................... G06F 3/017 382/190 |

(Continued)

OTHER PUBLICATIONS

Zhou, Quming, and Jake K. Aggarwal. "Tracking and classifying moving objects from video." Proceedings of IEEE Workshop on Performance Evaluation of Tracking and Surveillance. vol. 12. Hawaii, USA, 2001. APA.*

(Continued)

*Primary Examiner* — Michelle M Entezari
(74) *Attorney, Agent, or Firm* — Fenwick & West LLP

(57) ABSTRACT

Disclosed is a method and system for processing images from an aerial imaging device. A moving vehicle analysis system receives images from an aerial imaging device. The system may perform edge analysis in the images to identify a pairs of edges corresponding to a road. The system may identify pixel blobs in the images including adjacent pixels matching each other based on a pixel attribute. The system uses a machine learning model for generating an output identifying moving vehicles in the images. The system determines a count of the moving vehicles captured by the images, where each moving vehicle is associated with corresponding pixel blobs.

20 Claims, 13 Drawing Sheets

(56) References Cited

U.S. PATENT DOCUMENTS

| | | | | |
|---|---|---|---|---|
| 7,809,061 B1* | 10/2010 | Sarna | ............. | H04N 21/234327 375/240.16 |
| 8,315,477 B2* | 11/2012 | Acree | ................... | G01C 11/00 348/61 |
| 8,374,462 B2* | 2/2013 | Jiang | ................... | G06K 9/4671 382/162 |
| 9,442,176 B2* | 9/2016 | Bulan | ....................... | G06T 7/20 |
| 9,582,722 B2* | 2/2017 | Bernal | ............... | G06K 9/00785 |
| 2006/0064236 A1* | 3/2006 | Hayashi | ............... | G08G 1/0104 701/117 |
| 2007/0255480 A1 | 11/2007 | Southall et al. | | |
| 2009/0034793 A1* | 2/2009 | Dong | ................. | G06K 9/00369 382/103 |
| 2010/0104199 A1* | 4/2010 | Zhang | ................ | G06K 9/00798 382/199 |
| 2010/0322476 A1* | 12/2010 | Kanhere | ............. | G08G 1/0175 382/103 |
| 2011/0010023 A1 | 1/2011 | Kunzig et al. | | |
| 2011/0157407 A1* | 6/2011 | Lin | ........................ | G06K 9/036 348/222.1 |
| 2013/0027196 A1* | 1/2013 | Yankun | .............. | G06K 9/00805 340/435 |
| 2014/0050355 A1* | 2/2014 | Cobb | ................. | G06K 9/00771 382/103 |
| 2014/0085545 A1 | 3/2014 | Tu et al. | | |
| 2014/0313339 A1* | 10/2014 | Diessner | .................. | H04N 7/18 348/148 |
| 2014/0362230 A1 | 12/2014 | Bulan et al. | | |
| 2015/0117704 A1* | 4/2015 | Bulan | ....................... | G06T 7/20 382/103 |
| 2015/0298621 A1* | 10/2015 | Katoh | ..................... | B60R 11/04 348/148 |
| 2015/0336547 A1* | 11/2015 | Dagan | ....................... | B60T 7/22 701/70 |
| 2016/0039436 A1* | 2/2016 | Bhagwatkar | ........... | A63H 19/24 348/148 |
| 2016/0042234 A1* | 2/2016 | Chen | .................. | G06K 9/00785 382/190 |
| 2017/0024867 A1* | 1/2017 | Bousquet | ............. | G06K 9/0063 |
| 2017/0098304 A1* | 4/2017 | Blais-Morin | ...... | H04N 5/23229 |
| 2017/0123429 A1* | 5/2017 | Levinson | ............. | G05D 1/0088 |

OTHER PUBLICATIONS

Robert, Kostia. "Night-time traffic surveillance: A robust framework for multi-vehicle detection, classification and tracking." Advanced Video and Signal Based Surveillance, 2009. AVSS'09. Sixth IEEE International Conference on. IEEE, 2009. APA.*

PCT International Search Report and Written Opinion, PCT Application No. PCT/US16/61925, dated Feb. 1, 2017, 23 pages.

Krauß, T. et al., "Traffic Flow Estimation from Single Satellite Images," SMPR Conference 2013, Oct. 2013, 6 pages.

* cited by examiner

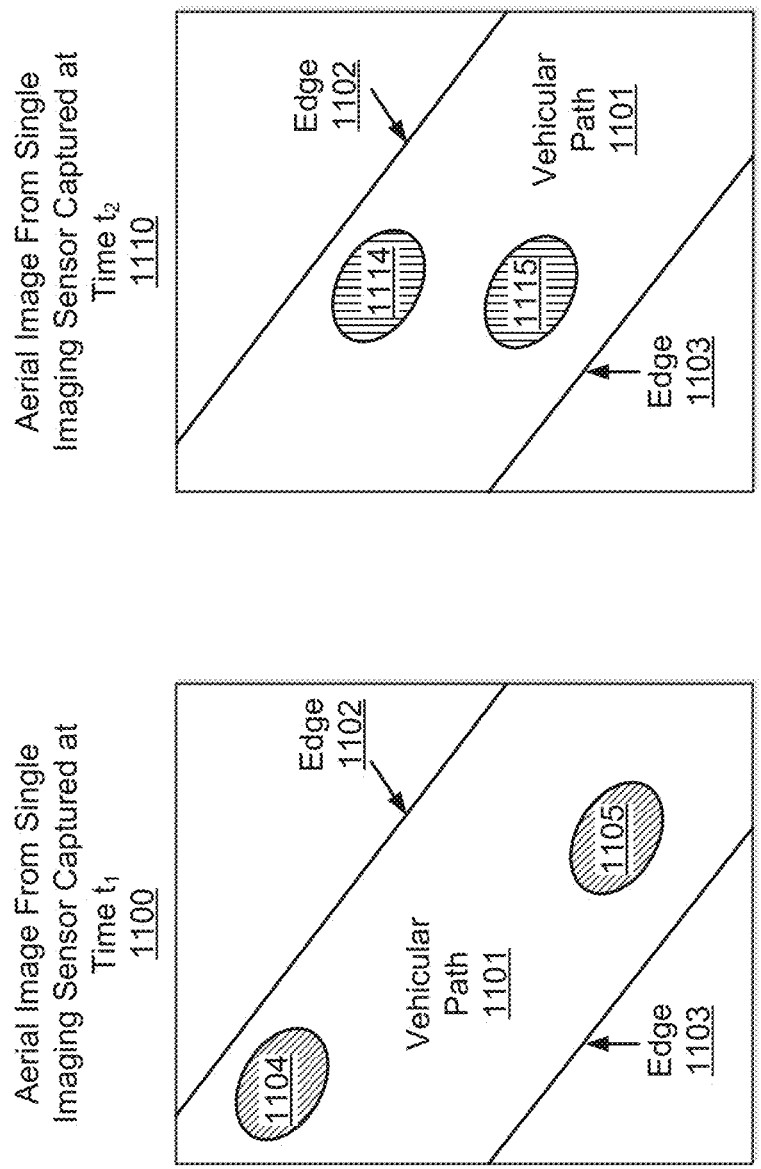

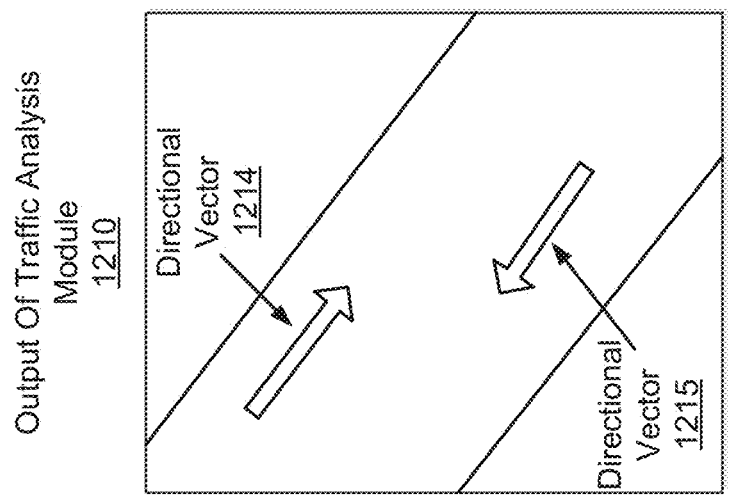
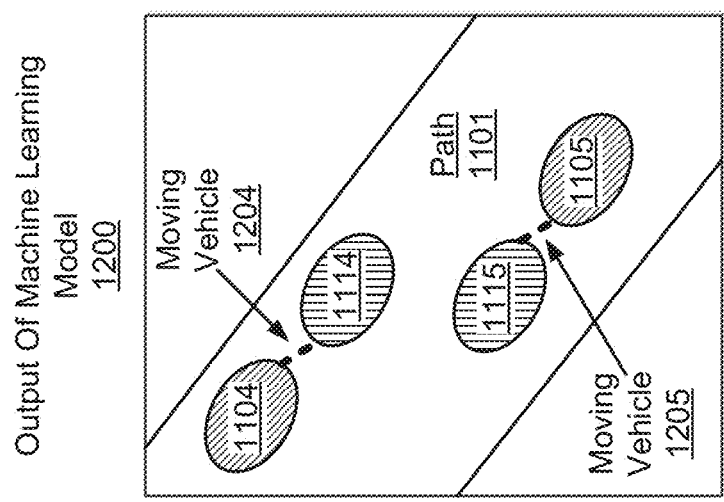
FIG. 12B
FIG. 12A

MOVING VEHICLE DETECTION AND ANALYSIS USING LOW RESOLUTION REMOTE SENSING IMAGERY

CROSS REFERENCE TO RELATED APPLICATION

This application claims the benefit of U.S. Provisional Application No. 62/256,072, filed Nov. 16, 2015, which is incorporated by reference in its entirety.

BACKGROUND

Field of Art

This disclosure relates generally to image processing of low resolution images and in particular to identifying moving vehicles in a geographical area using low resolution images captured by an aerial imaging device.

Description of Art

Several applications analyze aerial images to identify objects in the images, for example, various objects in aerial images captured by satellites. Analysis of high resolution images can be performed using relatively simple techniques. Obtaining high resolution aerial images typically requires use of large, expensive satellites and results. These satellites typically require a significant amount of resources. For example, such satellites carry sophisticated and expensive equipment such as high spatial resolution cameras, expensive transponders, and advanced computers. Other factors that contribute to the cost associated with expensive imaging satellites are the launch cost and maintenance. Expensive high spatial resolution imaging satellites must be monitored from a ground facility, which requires expensive manpower. These satellites are also susceptible to damage or costly downtimes. The high launch and development costs of expensive imaging satellites leads to a slowdown in the introduction of new or upgraded satellite imagery and communication services for object detection.

Cheaper low spatial resolution imaging satellites and drones may be used for capturing images. However, such satellites and drones provide unclear images. In low-resolution imagery, objects such as vehicles are typically not clearly identifiable and often appear as blobs containing a few adjacent pixels. In other instances, such as in infrared band imagery, the images are completely invisible to humans. Conventional image processing techniques fail to identify objects such as moving vehicles, cars, trucks, or speedboats from low resolution images taken by cheaper low resolution imaging satellites.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

FIG. 11 illustrates example low resolution aerial images captured from single imaging sensors at distinct times.

FIG. 12A illustrates an example output of the machine learning model for two moving vehicles.

FIG. 12B illustrates an example output of the traffic analysis module for two moving vehicles.

DETAILED DESCRIPTION

Figure 1:
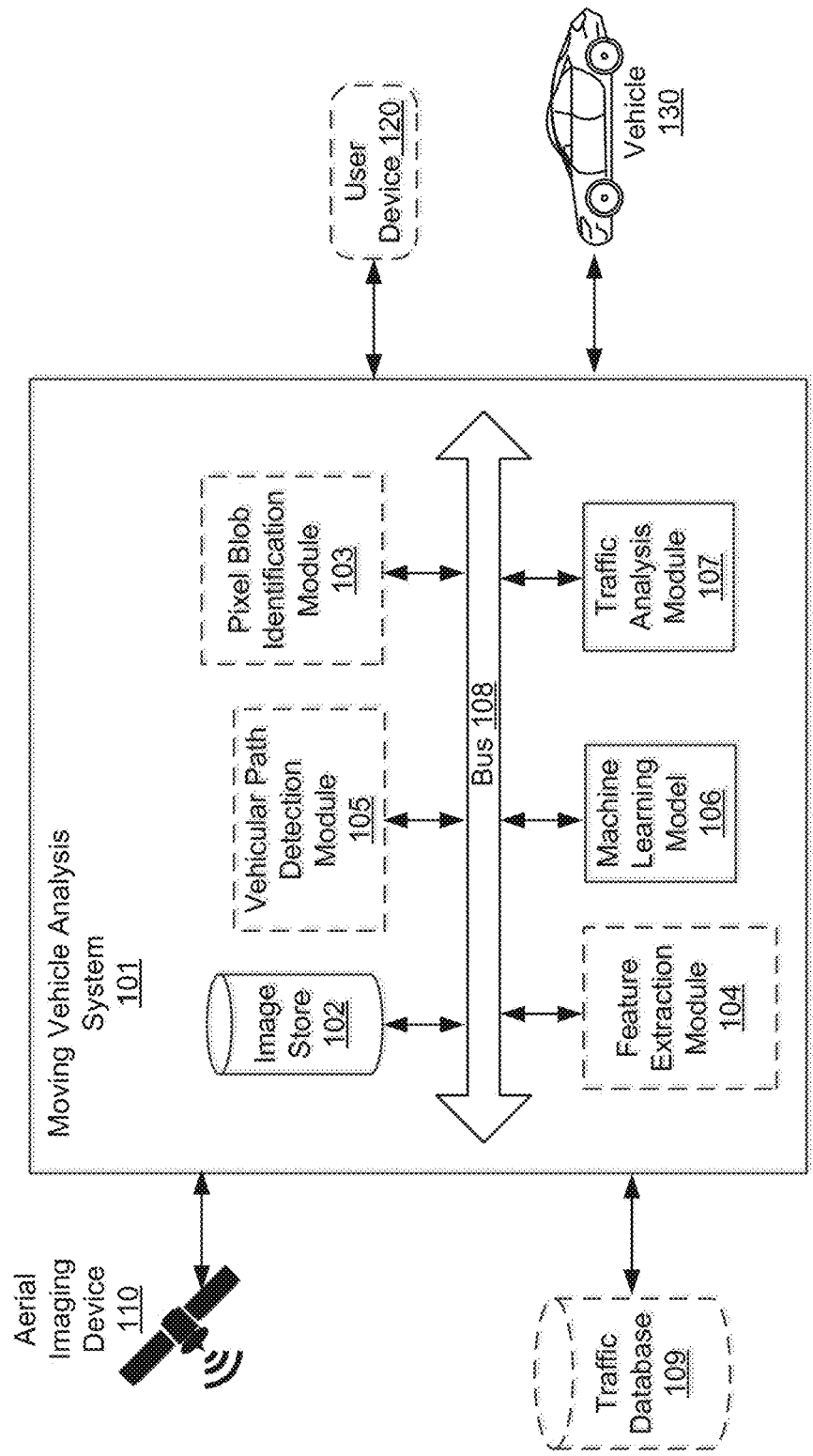
FIG. 1 illustrates a block diagram of an example system environment in which a moving vehicle analysis system operates.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Disclosed by way of example embodiments are systems, methods and/or computer program products (e.g., a computer readable storage media that stores instructions executable by one or more processing units) for identifying moving vehicles from low resolution aerial imagery. In one example embodiment, a moving vehicle analysis system receives low resolution images of a geographical area from an aerial imaging device, such as a satellite, drone, or other aerial configured imaging system. Within the aerial imaging device are multiple imaging sensors that capture images at different moments in time. A single imaging sensor captures an image at a particular time.

The moving vehicle analysis system extracts signals from noisy, low resolution images and identifies moving vehicles in the images. The pixel resolution of the received low resolution images is measured in Ground Sample Distance (GSD) units. In one example, the resolution of the received images is in the range of 3-5 meters/pixel. At this resolution, moving vehicles, such as cars, trucks, trains, ships, and speedboats appear as ambiguous pixel blobs of a few adjacent pixels each. Note that the terms "pixel blob" and "blob" may be used interchangeably in this description and each refers to a collection of adjacent pixels approximately matching each other, based on a pixel attribute. For example, a blob may include five adjacent pixels whose brightness attribute value is more than double that of all pixels surrounding the blob. In another example, each pair of pixels within a blob may include pixels whose brightness attribute value is within a threshold of each other.

The moving vehicle analysis system may perform edge analysis in the images to identify pairs of edges corresponding to vehicular paths. A vehicular path may be a path that a vehicle may travel upon or through, for example, a road, street, avenue, a shipping lane, railroad track etc. The moving vehicle analysis system may identify pixel blobs in the images by pixel clustering or other image processing techniques. The moving vehicle analysis system may extract a feature vector from the images. The feature vector may include feature describing the relative positions of blobs with respect to each other and with respect to vehicular paths.

In other example embodiments, the moving vehicle analysis system may provide the feature vector as input to a machine learning model for generating a score indicative of a likelihood that the blobs correspond to moving vehicles. The moving vehicle analysis system may associate blobs with moving vehicles if the generated score exceeds a threshold. In one example embodiment, the moving vehicle analysis system may determine a count of the moving vehicles in the images, where each moving vehicle is associated with corresponding blobs. The moving vehicle analysis system may determine the size, speed, and direction of each moving vehicle. The moving vehicle analysis system may analyze traffic patterns corresponding to the vehicular paths and send re-routing information to the moving vehicles responsive to the analyzed traffic pattern exceeding a threshold.

Example System Environment

FIG. 1 illustrates a block diagram of an example system environment in which a moving vehicle analysis system 101 operates. The example system environment shown in FIG. 1 may include an aerial imaging device 110, a moving vehicle analysis system 101, a traffic database 109, a client device 120, and a vehicle 130. The aerial imaging device 110 may be a satellite, drone, or other aerial configured imaging system, capable of capturing low resolution images. It is noted that the imaging system within the aerial imaging device 110 may include multiple imaging sensors that capture at different moments in time. The aerial imaging device 110 may capture multiple images with a time lag. The multiple images may correspond to the same spectral band or different spectral bands, where a spectral band corresponds to a range of wavelengths of light. Example spectral bands include the red spectral band, the green spectral band, the blue spectral band, the infrared spectral band, and the panchromatic spectral band.

A moving vehicle may appear as an ambiguous blob of adjacent pixels on each image, as illustrated and described below in detail with reference to FIG. 3. Because the images from the aerial imaging device 110 are captured at a time lag, moving vehicle blobs do not line up when the images from multiple imaging sensors are combined. For example, in an aerial imaging device 110 where each imaging sensor corresponds to a different spectral band, moving vehicle blobs can appear at different locations in the red, blue, and green spectral bands. This becomes apparent when images from the different imaging sensors are combined into a color image. An example low resolution aerial image containing blobs combined from multiple imaging sensors is illustrated and described below in FIG. 3.

The moving vehicle analysis system 101 illustrated in FIG. 1 may include an image store 102, an optional vehicular path detection module 105, an optional pixel blob identification module 103, an optional feature extraction module 104, a machine learning model 106, a traffic analysis module 107, and a bus 108. Optional components of the example system environment illustrated in FIG. 1 are shown using dashed lines. The image store 102 shown in FIG. 1 may store low resolution images received from the aerial imaging device 110. The vehicular path detection module 105, pixel blob identification module 103, feature extraction module 104, and machine learning model 106 may retrieve the images stored in the image store 102 for processing.

The optional vehicular path detection module 105 shown in FIG. 1 performs edge analysis in the received images to identify pairs of edges, where each pair of edges corresponds to a vehicular path, as illustrated and described below in detail with reference to FIG. 2. As previously noted, the vehicular path may be a path along with a vehicle travels, for example, a road, street, avenue, highway, unpaved road, railroad track, etc. In one example embodiment, the pixel blob identification module 103 shown in FIG. 1 takes images from the image store 102 and identifies blobs in each image. Each blob includes adjacent pixels that match each other based on a pixel attribute. In one example, a pixel attribute is a value from 0 to 256 that represents the pixel's brightness. Further details about how the moving vehicle analysis system 101 may identify blobs based on pixel attributes are disclosed in FIG. 2. The feature extraction module 104 may extract a feature vector from the received images describing the relative positions of blobs with respect to the vehicular paths identified by the vehicular path detection module 105 and with respect to other blobs, as illustrated and described below in detail with reference to FIG. 2. The feature vector may be transmitted to the machine learning model 106 for generating a score, which is indicative of a likelihood that the identified blobs correspond to one or more moving vehicles. In alternative embodiments, the machine learning model 106 may generate, based on the received images, an output including pixel blobs (including one or more adjacent pixels matching each other based on a pixel attribute) and a score indicative of a likelihood that the blobs corresponds to a moving vehicle.

The traffic analysis module 107 shown in FIG. 1 may store an association between blobs and a moving vehicle if the generated score for the blobs exceeds a threshold. The traffic analysis module 107 may determine a count of one or more moving vehicles in the received images, where each moving vehicle is associated with corresponding blobs, as illustrated and described below in detail with reference to FIG. 2. The traffic analysis module 107 also may determine speeds and sizes of moving vehicles. The traffic analysis module 107 also may analyze traffic patterns corresponding to the time of capture of the images, the count of the moving vehicles, the size of each moving vehicle, and their average speed. The traffic analysis module 107 also may send re-routing information to a client device 120 and vehicle 130 if the analyzed traffic pattern exceeds a threshold such as a traffic congestion value. The image store 102, vehicular path detection module 105, pixel blob identification module 103, feature extraction module 104, machine learning model 106, and traffic analysis module 107 communicate by a bus 108. Further details about the components of the moving vehicle analysis system 101 are provided in FIG. 2.

The optional external traffic database 109 shown in FIG. 1 may communicate with the moving vehicle analysis system 101 for the machine learning model 106 and traffic analysis module 107 to retrieve traffic information for processing. The traffic database 109 may contain information about traffic volumes at intersections with highways (volume, speed, vehicle classification, truck weight data, etc.), traffic growth and trends, seasonal adjustment factors used in determining estimates of annual average daily traffic (AADT) and directional design hour volume (DDHV) from the Department of Transportation. The traffic database 109 may contain map data collected from performing systematic ground surveys using tools such as a handheld GPS unit, a notebook, digital camera, voice recorder, etc., from the OpenStreetMap database. The machine learning model 106 may use the information in the traffic database 109 to identify blobs corresponding to moving vehicles. The traffic analysis module 107 may use the information in the traffic database 109 for analyzing traffic patterns including counts of moving vehicles, the size of each vehicle, the average speed, the density of vehicles, etc.

The moving vehicle analysis system 101 may interact with the client device 120 shown in FIG. 1. The client device 120 may be a computing device capable of receiving client input as well as transmitting and/or receiving data via a network. In one example embodiment, a client device 120 may be a conventional computer system, such as a desktop or laptop computer. Alternatively, a client device 120 may be a device having computer functionality, such as a personal digital assistant (PDA), a mobile telephone, a smartphone, a tablet, or another suitable device. The vehicle 130 also may be capable of receiving client input as well as transmitting and/or receiving data via a network. In one embodiment, a vehicle 130 contains a GPS device that can also communicate with the moving vehicle analysis system 101 via a network. The moving vehicle analysis system 101 may convert the blobs to a visual representation of moving vehicles, deliver the visual representation of the moving vehicles to user device 120, output a visual representation of the moving vehicles to a user interface such as through graphical icons and visual indicators, etc.

Example System Architecture

Figure 2:
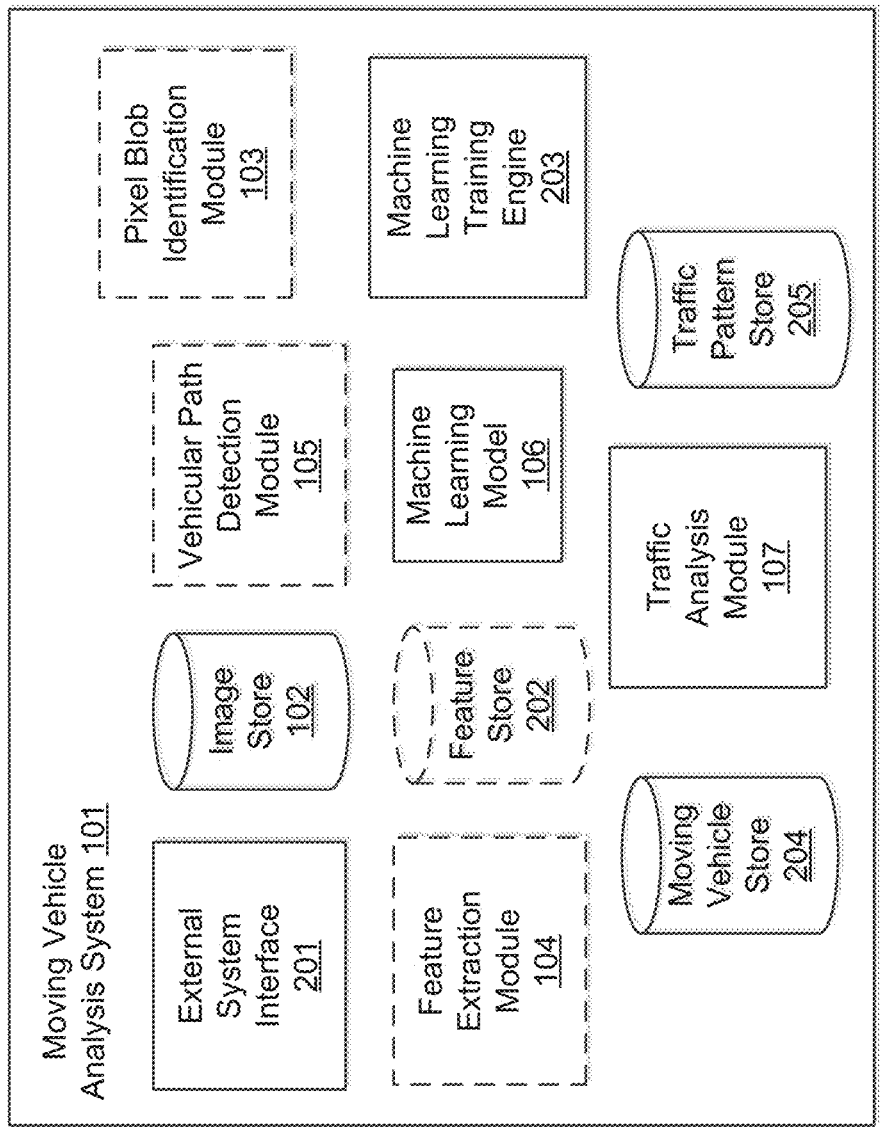
FIG. 2 illustrates a block diagram of an example system architecture for the moving vehicle analysis system.

FIG. 2 illustrates a block diagram of an example system architecture for a moving vehicle analysis system 101. The system architecture shown in FIG. 2 may include an external system interface 201, an image store 102, an optional vehicular path detection module 105, an optional pixel blob identification module 103, an optional feature extraction module 104, an optional feature store 202, a machine learning model 106, a machine learning training engine 203, a moving vehicle store 204, a traffic analysis module 107, and a traffic pattern store 206. Optional components in FIG. 2 are shown using dashed lines.

The external system interface 201 shown in FIG. 2 may be a dedicated hardware or software networking device that receives data packets representing images from the aerial imaging device 110. The external system interface 201 may forward data packets representing rerouting information from the moving vehicle analysis system 101 via a network to client devices and vehicles. In one example, the external system interface 201 forwards data packets at high speed along the optical fiber lines of the Internet backbone. In another example, the external system interface 201 exchanges routing information using the Border Gateway Protocol (BGP) and may be an edge router, a border router, or a core router.

The image store 102 shown in FIG. 2 may store low resolution images received from the aerial imaging device. The vehicular path detection module 105, pixel blob identification module 103, and feature extraction module 104 may retrieve images stored by the image store 102 for processing. The image store 102 may be organized as a database or table of images stored on one or more of removable or non-removable memory cards, tape cassettes, zip cassettes, and computer hard drives. In one embodiment, the image store 102 may include multiple data fields, each describing one or more attributes of the images. In one example, the image store 102 contains, for a single image, the time of capture, spectral band information, geographical area coordinates, etc.

The vehicular path detection module 105 shown in FIG. 2 may perform edge analysis in the received images to identify pairs of edges, where each pair of edges corresponds to a vehicular path. An example image containing vehicular paths is illustrated and described below in detail with reference to FIG. 8. A vehicular path may be a road, street, avenue, highway, unpaved road, etc. The vehicular path detection module 105 may be configured to narrow down the search space for detecting moving vehicles within the images from the image store 102 by selecting a vehicular path, e.g., roads, highways, or other paths, in which moving vehicles are expected.

The vehicular path detection module 105 shown in FIG. 2 may operate on each pixel location (i, j) in an image. In one example embodiment, S represents an image and M represents the corresponding road map image output. The function $M(i, j)$ is defined to be 1 whenever location (i, j) in image S corresponds to a road pixel and 0 otherwise. The vehicular path detection module 105 may identify points in an image at which the pixel attributes change sharply. The points at which pixel attributes change sharply may be organized into a set of curved line segments termed edges. The vehicular path detection module 105 may perform three steps in the edge analysis process to identify pairs of edges: filtering, enhancement, and detection. The filtering step reduces noise such as salt and pepper noise, impulse noise and Gaussian noise in the images. The enhancement emphasizes pixels at locations (i, j) where there is a significant change in the pixel attribute value. In one example, the vehicular path detection module 105 performs enhancement by computing the gradient magnitude of the image at various pixel locations (i, j). The detection searches for pixel locations (i, j) that have a gradient value higher than a threshold to detect edge pixels. The vehicular path detection module 105 combines edges into edge pairs, corresponding to vehicular paths, based on the location of the pixels lying on each edge. In one example, a first edge of pixels is paired with a second edge of pixels into a vehicular path if the mean difference between the corresponding pixel locations of the two edges is less than the mean difference between the corresponding pixel locations of the first edge and any other edge. Because each received image is of the same geographical region, the vehicular path detection module 105 performs edge analysis on only one image and overlays the identified vehicular paths on the remaining images.

In alternative embodiments, the vehicular path detection module 105 shown in FIG. 2 may analyze an image to create a probabilistic heat map or blocked image containing an area of interest of vehicular paths where moving vehicles are expected. The vehicular path detection module 105 may be further configured to incorporate other mapping sources, which contain geometric information (points, lines, and polygons). The vehicular path detection module 105 may use the geometric information to directly create the probabilistic heat map or in conjunction with other image processing operations such as a line finding algorithm, random forest algorithm, Support Vector Machines (SVM), neural network, convolutional neural network (CNN), etc.

In one example embodiment, the pixel blob identification module 103 shown in FIG. 2 may identify blobs of adjacent pixels using pixel clustering. Within an identified blob, adjacent pixels match each other based on a pixel attribute. In one example, for a grayscale image, the pixel attribute is a single number that represents the brightness of the pixel. In this example, the pixel attribute is a byte stored as an 8-bit integer giving a range of possible values from 0 to 255. Zero represents black and 255 represents white. Values in between 0 and 255 make up the different shades of gray. In another example of color images, separate red, green and blue components are specified for each pixel. In this example, the pixel attribute is a vector of three numbers.

The pixel blob identification module 103 shown in FIG. 2 may identify pixel blobs in the images from the image store 102 received via the external system interface 201 by pixel clustering to identify adjacent pixels matching each other based on a pixel attribute, e.g., brightness or color. In one example, the pixel blob identification module 103 begins by initializing each pixel in an image as a region with the attribute of the pixel. The pixel blob identification module 103 identifies two adjacent regions having the most similar attribute value. These two regions are merged to form a new region containing all the pixels of the two regions and having the attribute value as the average of the attribute values of the two regions. The pixel blob identification module 103 repeats the process until there are no similar regions left.

In another example embodiment, where each imaging sensor in aerial imaging device 110 corresponds to a different spectral band, blobs can appear at different locations in the red, blue, and green spectral bands, as illustrated and described below in detail with reference to FIG. 3. In this embodiment, the pixel blob identification module 103 shown in FIG. 2 uses pixel clustering to identify pixel locations (matching each other based on a pixel attribute) where the attribute value of the image corresponding to one band is significantly different than the other bands. In one example, a pixel at location (i, j) in the green band image is identified as part of a blob if G(i, j)>2×R(i, j), where G(i, j) is the attribute value of the pixel at location (i, j) in the green band image and R(i, j) is the attribute value of the pixel at location (i, j) in the red band image. In this embodiment, the pixel blob identification module 103 can also be configured to process an image composed of different numbers of bands, where images corresponding to individual bands have been combined into a single multi-spectral image. Individual pixel values are compared and analyzed for the same locations across the different bands for the image.

In another example embodiment, the pixel blob identification module 103 shown in FIG. 2 may use pixel clustering to examine a region or window of pixels to detect blobs of adjacent pixels matching each other based on a pixel attribute. In this embodiment, the pixel blob identification module 103 receives an image from the image store 102, finds candidate regions to analyze, and analyzes the regions to determine which regions contain blobs. In one example, a sliding window approach is used, where a rectangular 3×3 pixel region continuously moves across the image to identify candidate regions exhaustively. In this example, a blob is detected when the average attribute value of pixels (matching each other based on the pixel attribute) within the region corresponding to one band is significantly different than the other bands. In another embodiment, after candidate regions have been selected, the pixel blob identification module 103 identifies "brighter" regions (matching each other based on the pixel attribute) when compared to the surrounding "vehicular path" areas.

Other embodiments of the pixel blob identification module 103 shown in FIG. 2 may use one or a combination of the following: (a) region proposal algorithms, such as Selective Search, which uses heuristics to determine the best set of candidate window regions; (b) edge/corner detection methods, such as Harris Corner or Canny edge, which find edges or corners in the image to use as candidate regions; (c) image gradients, which extract edge strength information; (d) oriented filters, which identify specific blob shapes; (e) thresholding methods, which use local or global threshold values to extract moving vehicles blobs; (f) image patch descriptors such as Scale-Invariant Feature Transform (SIFT), Speeded Up Robust Features (SURF), Features from Accelerated Segment Test (FAST), Binary Robust Independent Elementary Features (BRIEF), Fast Retina Keypoint (FREAK), and Histogram of Oriented Gradients (HOG), which calculate orientation and edge description features at a given image patch. An example low resolution aerial image containing identified pixel blobs is illustrated and described in FIG. 9.

Referring back to FIG. 2, the feature extraction module 104 may extract a feature vector from the received images describing the relative positions of blobs with respect to the vehicular paths identified by the vehicular path detection module 105 and with respect to other blobs. The feature extraction module 104 reduces the redundancy in images, e.g., repetitive pixel values, to transform an image into a reduced set of features (features vector). The feature vector contains the relevant information from the images, such that moving vehicles can be identified as pluralities of blobs by a machine learning model 106 by using this reduced representation instead of the complete initial image. The feature vector may include at least one feature describing a relative position of a blob with respect to a pair of edges corresponding to a vehicular path. Example features extracted by the feature extraction module are illustrated and described in FIG. 4 and FIG. 5. In one embodiment, the following dimensionality reduction techniques are used by the feature extraction module 104: independent component analysis, Isomap, Kernel PCA, latent semantic analysis, partial least squares, principal component analysis, multifactor dimensionality reduction, nonlinear dimensionality reduction, Multilinear Principal Component Analysis, multilinear subspace learning, semidefinite embedding, Autoencoder, and deep feature synthesis.

The feature store 202 shown in FIG. 2 stores features extracted from received images by the feature extraction module 104. The moving vehicle analysis system 101 retrieves the stored features for training the machine learning model 106 as well as for associating moving vehicles with pluralities of blobs. Details of features stored in the feature store 202 are provided in FIG. 4 and FIG. 5.

Figure 4:
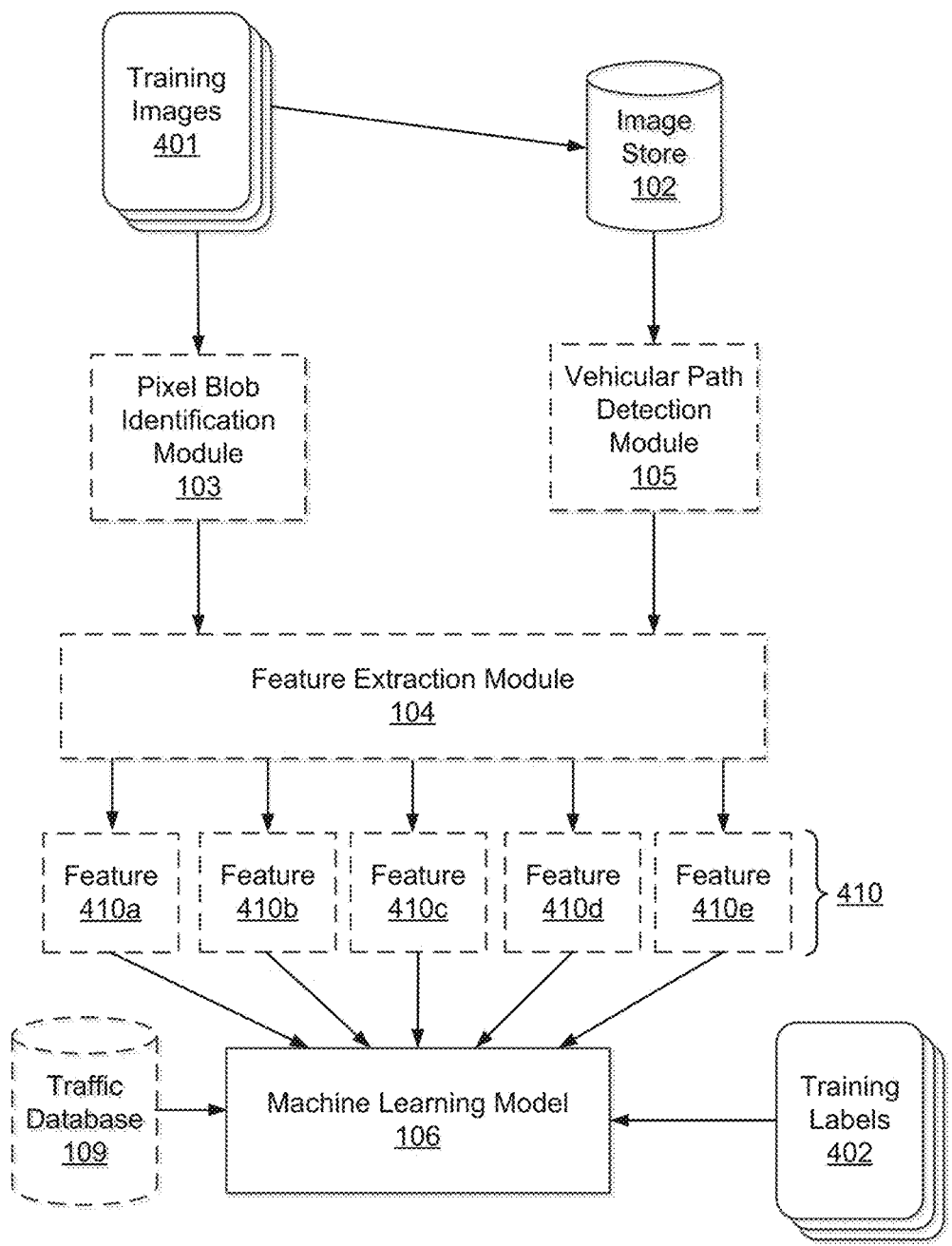
FIG. 4 illustrates an example process for a machine learning training engine in the moving vehicle analysis system.
Figure 5:
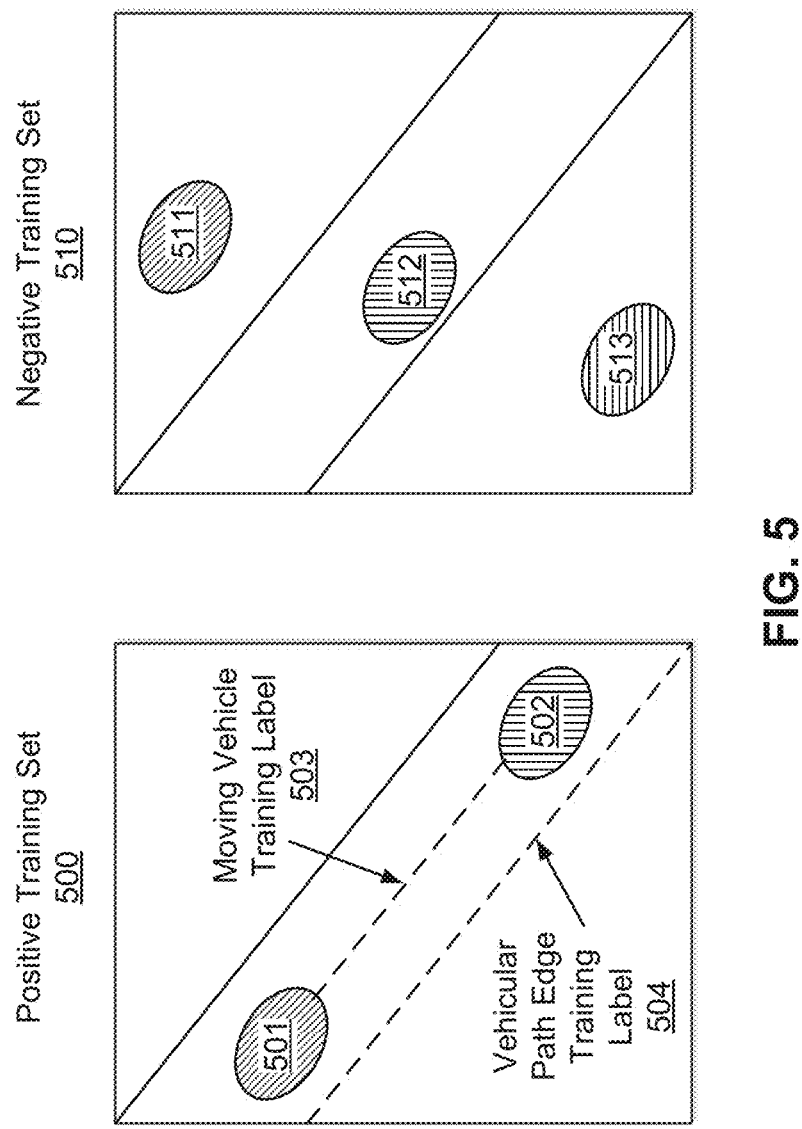
FIG. 5 illustrates example training sets for a machine learning model in the moving vehicle analysis system.

The moving vehicle analysis system 101 may train the machine learning model 106 using training sets and data from the feature store 202. In one embodiment, the machine learning model 106 receives training sets including labeled blobs corresponding to moving vehicles or labeled edges corresponding to vehicular paths. The machine learning training engine 203 shown in FIG. 2 trains the machine learning model 106 using training sets to determine a score for two or more blobs. The score is indicative of a likelihood that the blobs corresponds to a moving vehicle based on the feature vector. Training sets are illustrated in FIG. 5. The process followed by the machine learning training engine 203 is illustrated in FIG. 4. The moving vehicle analysis system 101 selects blobs based on whether the score exceeds a threshold and associates the blobs with a moving vehicle.

In alternative embodiments, the machine learning model 106 shown in FIG. 2 (in the form of a convolutional neural network) may generate an output, without the need for feature extraction, edge analysis or blob identification, directly from the images. A CNN is a type of feed-forward artificial neural network in which the connectivity pattern between its neurons is inspired by the organization of a visual cortex. Individual cortical neurons respond to stimuli in a restricted region of space known as the receptive field. The receptive fields of different neurons partially overlap such that they tile the visual field. The response of an individual neuron to stimuli within its receptive field can be approximated mathematically by a convolution operation. CNNs are based on biological processes and are variations of multilayer perceptrons designed to use minimal amounts of preprocessing. Advantages of CNNs include the obviation of feature extraction and the use of shared weight in convolutional layers, which means that the same filter (weights bank) is used for each pixel in the layer; this both reduces memory footprint and improves performance. The output of the machine learning model 106 (in the form of a CNN) may include blobs, where each blob includes one or more adjacent pixels in a distinct image of the images, where the adjacent pixels match each other based on a pixel attribute. The output may include a score indicative of a likelihood that the blobs correspond to a moving vehicle. The output may include one or more pixels locations corresponding to a blob. The output may include pixel locations corresponding to a vehicular path. The output may include the number of pixels in each blob. The output may include an association between the blobs and a moving vehicle.

The moving vehicle store 204 shown in FIG. 2 may store information representing moving vehicles received from the machine learning model 106. The moving vehicle store 204 may be organized as a database, table, or file stored on one or more of removable or non-removable memory cards, tape cassettes, zip cassettes, and computer hard drives. In one embodiment, the moving vehicle store 204 stores multiple data fields, each describing one or more attributes of the moving vehicles identified. In one example, the moving vehicle store 204 stores the count of the number of moving vehicles identified in the received images, and for a single vehicle, the time of capture, geographical region coordinates, diameter of each blob in pixels, size of the vehicle, speed and direction of the vehicle, etc.

The traffic analysis module 107 shown in FIG. 2 receives information from the moving vehicle store 204 and analyzes it on a per-vehicle basis, a per-vehicular path basis, or on a geographical region basis. In one example embodiment, the traffic analysis module 107 receives information corresponding to the pixel resolution of the images from the image store 202. The pixel resolution of low resolution images is generally measured in GSD units of 3-5 meters/pixel. In this embodiment, the traffic analysis module 107 also receives information corresponding to the number of pixels in each blob corresponding to the vehicle from the moving vehicle store 204. In one example, r represents the pixel resolution in meters/pixel, $d(k)$ represents the diameter of a blob k corresponding to a vehicle v, and n represents the number of blobs corresponding to vehicle v. The traffic analysis module 107 determines the size of vehicle v as $(\Sigma_k d(k))/n \times r$, where $(\Sigma_k d(k))/n$ is the average diameter in pixels of all blobs corresponding to vehicle v.

In another example embodiment, the traffic analysis module 107 shown in FIG. 2 determines the lengths of vehicular paths in the images. In this example embodiment, the traffic analysis module 107 receives information corresponding to the pixel resolution of the images from the image store 202. The traffic analysis module 107 may determine the number h of pixels associated with a length l of a vehicular path by assigning a label to every pixel in the path and counting the labeled pixels along the edges of the path. The traffic analysis module 107 may determine the length l of the vehicular path based on the pixel resolution and the number of pixels h associated with the length of the vehicular path. In one example, r represents the pixel resolution in meters/pixel, h1 represents the number of pixels associated with the first edge of a vehicular path, and h2 represents the number of pixels associated with the second edge of the vehicular path. The traffic analysis module 107 determines the length l of the vehicular path as $l=(h1+h2)/2 \times r$, where $(h1+h2)/2$ is the average number of pixels associated with the length of the vehicular path.

In another example embodiment, the traffic analysis module 107 shown in FIG. 2 determines the density of moving vehicles on a vehicular path based on the count of the moving vehicles and the length of the vehicular path. In one example, c represents the count of the moving vehicles and l represents the length of the vehicular path. The traffic analysis module 107 determines the density of moving vehicles as c/l.

In another example embodiment, the traffic analysis module 107 shown in FIG. 2 determines a directional vector for the corresponding blobs associated with a moving vehicle by determining a difference between a centroid of each blob of the corresponding blobs, as illustrated and described below in detail with reference to FIG. 11. The traffic analysis module 107 determines the centroid or geometric center of a blob by the arithmetic mean location of all the pixel locations in the blob as $\Sigma_{ij}(i, j)/m$, where (i, j) represents the location of a pixel in the blob and m represents the number of pixels in the blob. In one example, there are two blobs a and b corresponding to a moving vehicle, each blob corresponding to one image. In this example, (i, j) represents the location of a pixel in blob a, and m represents the number of pixels in blob a. Further, (p, q) represents the location of a pixel in blob b and s represents the number of pixels in blob b. The traffic analysis module 107 determines the directional vector as $\Sigma_{ij}(i, j)/m - \Sigma_{pq}(p, q)/s$. This process is illustrated in FIG. 11. The directional vector corresponds to a speed and a direction of the moving vehicle.

The traffic analysis module 107 shown in FIG. 2 may determine the length of the directional vector as $r \times (\Sigma_{ij}(i, j)/m - \Sigma_{pq}(p, q)/s)$, where r is the pixel resolution. In another example, $t_a$ represents the time of capture of the image containing blob a and $t_b$ represents the time of capture of the image containing blob b. In this example, the traffic analysis module 107 determines the speed of the moving vehicle by the length of the directional vector divided by the difference in time between images a and b as $(r \times (\Sigma_{ij}(i, j)/m - \Sigma_{pq}(p, q)/s))/(t_a - t_b)$, as illustrated and described below in detail with reference to FIG. 12. In another example, the traffic analysis module 107 determines the direction of the moving vehicle by $\tan^{-1}(q-j/p-i)$, where $(q-j/p-i)$ is the ratio of the difference between the Y co-ordinates of the two centroids to the difference between the X co-ordinates of the two centroids.

In another example embodiment, the traffic analysis module 107 shown in FIG. 2 may determine the average speed of the moving vehicles identified in the received images as the sum of the speeds of the one or more moving vehicles divided by the count of the one or more moving vehicles. The traffic analysis module 107 analyzes a traffic pattern comprising a time of capture of an image, the count of the moving vehicles on a vehicular path, the size of the moving vehicles, the average speed, the density of moving vehicles, and the length of the vehicular path. If the average speed falls below a threshold or the count or density of moving vehicles exceeds a threshold, the moving vehicle analysis system 101 may send rerouting information to a client device 120 or a vehicle 130 via the external system interface 201. In one example, the rerouting information may be determined using Dijkstra's algorithm, the Bellman-Ford algorithm, A* search, Floyd-Warshall algorithm, Johnson's algorithm, Viterbi algorithm, etc.

The traffic pattern store 206 shown in FIG. 2 may store traffic patterns received from the traffic analysis module 107. The traffic pattern store 206 may be organized as a database or table stored on one or more of removable or non-removable memory cards, tape cassettes, zip cassettes, and computer hard drives. In one embodiment, the traffic pattern store 206 stores multiple data fields, each describing one or more attributes of a vehicular path. In one example, the traffic pattern store 206 stores, for a single vehicular path, the time of capture of images, geographical region coordinates, the count of the one or more moving vehicles on the vehicular path, the size of each of the one or more moving vehicles, the average speed, the density of moving vehicles, the length of the vehicular path, etc.

Low Resolution Aerial Image

Figure 3:
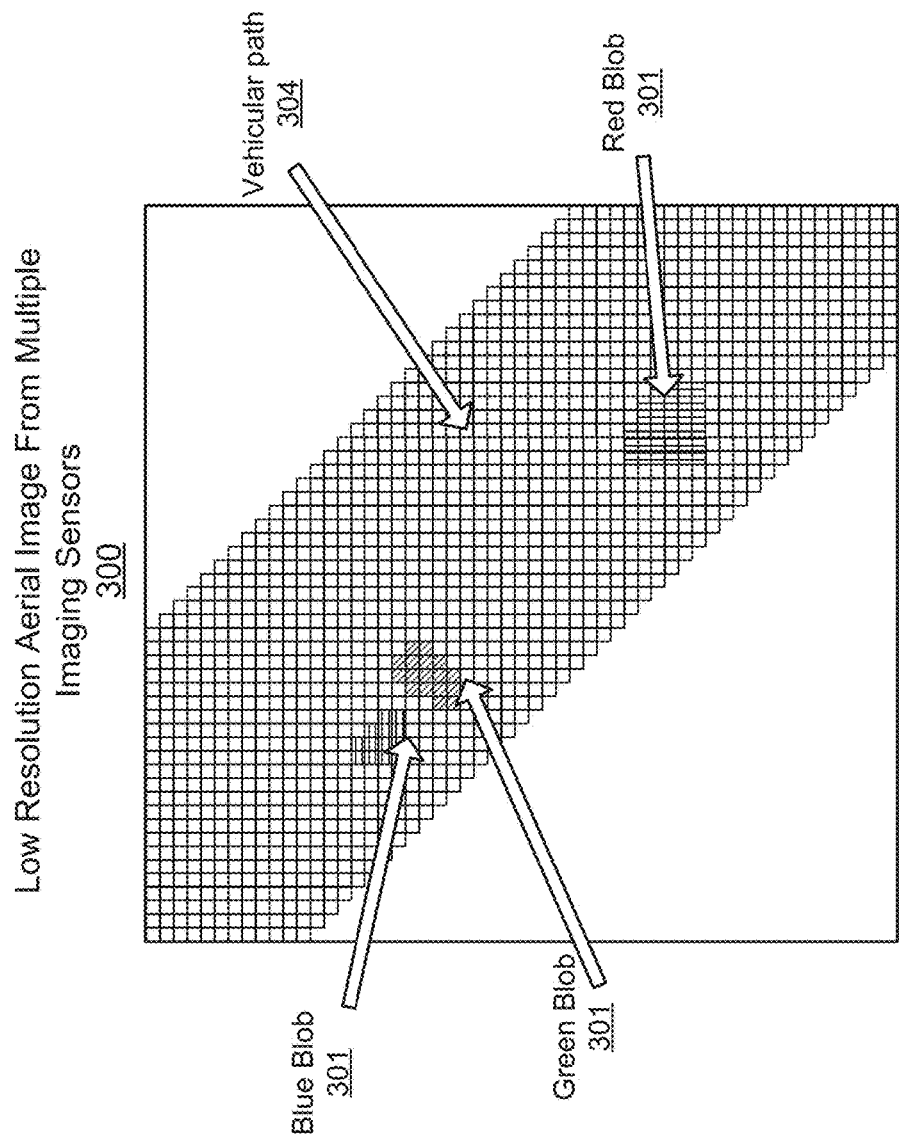
FIG. 3 illustrates an example low resolution aerial image taken from multiple imaging sensors.

Referring now to FIG. 3, it illustrates an example low resolution aerial image 300 combined from three red, blue, and green imaging sensors within aerial imaging device 110, each sensor capturing a distinct image in a different band. Combined image 300 includes a blue blob 301, green blob 301, red blob 303, and a vehicular path 304. The three imaging sensors within aerial imaging device 110 capture distinct images at small time differences. The captured images appear the same when combined into image 300 since most objects within the image are not moving (e.g., vehicular path 304, trees, houses, etc.). However, moving vehicles do not line up perfectly because of the difference in time of capture when the different images are combined. For example, moving vehicles can appear as blobs at different locations in the red, blue, and green band. This is apparent when the three images are combined into the single image 300. In image 300, blob 301, shown in FIG. 3 as a collection of blue-colored pixels, is captured by the blue spectrum imaging sensor. In image 300, blob 302, shown in FIG. 3 as a collection of green-colored pixels, is captured by the green spectrum imaging sensor. In image 300, blob 303, shown in FIG. 3 as a collection of red-colored pixels, is captured by the red spectrum imaging sensor. The blue blob 301 and green blob 302 are closer together in image 300 because the time delay between those two spectral bands is smaller compared to the time delay between the blue and red spectral bands or the time delay between the green and red spectral bands.

The vehicular path pixels may be identified as described in detail with reference to FIG. 2. In alternative embodiments, the aerial imaging device 110 may capture images from the infrared and panchromatic bands. The aerial imaging device 110 can be further configured to capture images from a single band at distinct times. The obtained images are transmitted to the moving vehicle analysis system 101 via the external system interface 201.

Example Machine Learning Training Process

FIG. 4 illustrates an example training process for the machine learning training engine 203 for the machine learning model 106 in the moving vehicle analysis system 101. The process may use training images 401, the pixel blob identification module 103, the image store 102, the vehicular path detection module 105, the feature extraction module 104, a feature vector 410, the machine learning model 106, the traffic database 109, and training labels 402. Optional elements are shown using dashed lines in FIG. 4. In one embodiment, the pixel blob identification module 103 shown in FIG. 4 may perform pixel clustering to identify blobs by, for each image of the training images 401, identifying blobs comprising adjacent pixels, wherein the adjacent pixels match each other based on a pixel attribute. The pixel blob identification module 103 may send the training images 401 containing identified blobs to the feature extraction module 104.

The image store 102 shown in FIG. 4 also receives training images 401 and transmits them to the vehicular path detection module 105. The vehicular path detection module 105 performs edge analysis, as illustrated and described in detail above in FIG. 2, in the training images 401 to identify pairs of edges, each pair of edges corresponding to a vehicular path. The feature extraction module 104 shown in FIG. 4 extracts a feature vector 410 from the training images 401 and the vehicular paths. The features corresponding to the training images 401 are used for training the machine learning model 106 based on training labels 402. Details of training labels 402 are illustrated and described in FIG. 5.

The feature vector 410 shown in FIG. 4 may have at least one feature representing a relative position of a blob within an image. In one example embodiment, in which the pixel blob identification module 103 identifies blobs, a feature 410a may represent whether a blob is located between the pair of edges corresponding to the vehicular path; this feature teaches the machine learning model 106 that the blob may represent a moving vehicle on a vehicular path. FIG. 4 and the other figures use like reference numerals to identify like elements. A letter after a reference numeral, such as "410a," indicates that the text refers specifically to the element having that particular reference numeral. A reference numeral in the text without a following letter, such as "410," refers to any or all of the elements in the figures bearing that reference numeral, e.g., "410" in the text refer to reference numerals "410a" and/or "410b" in the figures.

A feature 410b shown in FIG. 4 may represent whether two blobs intersect each other; this feature teaches the machine learning model 106 that the two blobs may not represent a moving vehicle because vehicles cannot intersect. A feature 410c may represent whether a difference between the centroid of each blob of a group of blobs matches a labeled direction of the vehicular path in the training labels 402; this feature teaches the machine learning model 106 that the blobs may represent a moving vehicle because it is moving in the correct direction. A feature 410d may represent whether blobs are located at the same pixel locations in more than one image; this feature teaches the machine learning model 106 that the blobs may not represent moving vehicles because the blobs did not move locations between images captured at different times.

In alternative embodiments, the machine learning model 106 shown in FIG. 4 (in the form of a CNN) may generate an output directly from the images, without the need for feature extraction, edge analysis or blob identification. The machine learning model 106 shown in FIG. 4 (in the form of a CNN) may identify pixel blobs within images, as illustrated and described in detail above in FIG. 2. In such embodiments, a feature 410e may represent an association between pixel locations and a pixel attribute. For example, a feature may represent the brightness value of a pixel relative to pixels located on its right in an image; this feature teaches the machine learning model 106 that the pixel may be part of a blob representing a moving vehicle because the pixel is brighter than surrounding pixels. In another example, a feature may represent the brightness of a pixel relative to the average brightness of pixels located on the same row in an image; this feature teaches the machine learning model 106 that the pixel may be part of a blob representing a moving vehicle because the pixel is brighter than surrounding pixels.

The machine learning training engine 203 may train the machine learning model 106 shown in FIG. 4 using the feature vector 410 and training labels 402. In one embodiment, the machine learning model 106 is thereby configured to determine a score for each pixel location in an image, the score indicative of a likelihood that the pixel location corresponds to a blob. In another embodiment, the machine learning model 106 is configured to determine a score for blobs, the score indicative of a likelihood that the blobs correspond to a moving vehicle. In alternative embodiments, the machine learning model 106 is configured to generate an output including blobs and a score indicative of a likelihood that the blobs corresponds to a moving vehicle. In an embodiment, the machine learning model 106 is configured to generate an output including one or more pixels locations corresponding to a blob and a score indicative of a likelihood that the pixels locations correspond to a blob. In an embodiment, the machine learning model 106 is configured to generate an output including pixel locations corresponding to a vehicular path and a score indicative of a likelihood that the pixel locations correspond to a vehicular path. In an embodiment, the machine learning model 106 is configured to generate an output including a number of pixels in each identified blob. In an embodiment, the machine learning model 106 is configured to generate an output including an association between the identified blobs and a moving vehicle.

The machine learning model training engine 203 shown in FIG. 4 may apply machine learning techniques to train the machine learning model 106 that when applied to features outputs indications of whether the features have an associated property or properties, e.g., that when applied to features of received images outputs estimates of whether there are moving vehicles present, such as probabilities that the features have a particular Boolean property, or an estimated value of a scalar property. As part of the training of the machine learning model 106, the machine learning training engine 203 forms a training set of features 410 and training labels 402 by identifying a positive training set of features that have been determined to have the property in question (presence of moving vehicles), and, in some embodiments, forms a negative training set of features that lack the property in question, as described below in detail with reference to FIG. 5. For example, each training set may include labeled blobs corresponding to a moving vehicle. The machine learning training engine 203 may applies dimensionality reduction (e.g., via linear discriminant analysis (LDA), principle component analysis (PCA), or the like) to reduce the amount of data in the feature vector 410 to a smaller, more representative set of data.

The machine learning training engine 203 may use supervised machine learning to train the machine learning model 106 shown in FIG. 4, with the feature vectors 410 of the positive training set and the negative training set serving as the inputs. In other embodiments, different machine learning techniques, such as linear support vector machine (linear SVM), boosting for other algorithms (e.g., AdaBoost), logistic regression, naïve Bayes, memory-based learning, random forests, bagged trees, decision trees, boosted trees, boosted stumps, neural networks, CNNs, etc., may be used. The machine learning model 106, when applied to the feature vector 410 extracted from a set of received images, outputs an indication of whether blobs has the property in question, such as a Boolean yes/no estimate, or a scalar value representing a probability.

In some example embodiments, a validation set is formed of additional features, other than those in the training sets, which have already been determined to have or to lack the property in question. The machine learning training engine 203 applies the trained machine learning model 106 shown in FIG. 4 to the features of the validation set to quantify the accuracy of the machine learning model 106. Common metrics applied in accuracy measurement include: Precision=TP/(TP+FP) and Recall=TP/(TP+FN), where precision is how many the machine learning model 106 correctly predicted (TP or true positives) out of the total it predicted (TP+FP or false positives), and recall is how many the machine learning model 106 correctly predicted (TP) out of the total number of features that did have the property in question (TP+FN or false negatives). The F score (F-score=2×PR/(P+R)) unifies precision and recall into a single measure. In one embodiment, the machine learning training engine 203 iteratively re-trains the machine learning model 106 until the occurrence of a stopping condition, such as the accuracy measurement indication that the machine learning model 106 is sufficiently accurate, or a number of training rounds having taken place.

In alternative embodiments, the machine learning model 106 may be a CNN that learns useful representations (features) such as which blobs correspond to moving vehicles directly from training sets without explicit feature extraction. For example, the machine learning model 106 may be an end-to-end recognition system (a non-linear map) that takes raw pixels from the training images 401 directly to internal labels.

In an embodiment, the machine learning model 106 may use information about traffic patterns from the traffic database 109 in which data becomes available in a sequential order and is used to update the machine learning model 106's best predictor for future data at each step. In an example, the traffic database 109 may be used to dynamically adapt the machine learning model 106 to new patterns in the traffic database 109 as a function of time. In this embodiment, the machine learning training engine 203 may use statistical learning models (e.g. stochastic gradient descent, perceptrons) or adversarial models.

Example Training Sets for the Machine Learning Model

FIG. 5 illustrates example training sets 500 and 510 for the machine learning model 106 in the moving vehicle analysis system 101. Each training set includes the training images 401 and training labels 402 illustrated and described in FIG. 4. The positive training set 500 shown in FIG. 5 contains features 410 that have been determined to have the presence of moving vehicles. The positive training set 500 is a combined image from images taken at distinct times. The positive training set 500 includes two labeled pixel blobs 501 and 502. In one example, pixel blob 501 corresponds to the green spectral band and pixel blob 502 corresponds to the red spectral band. The positive training set 500 further includes a moving vehicle training label 503 used by the machine learning model training engine 203 to train the machine learning model 106 that the two pixel blobs 501 and 502 correspond to a moving vehicle. The positive training set 500 further includes a vehicular path edge training label 504 used by the machine learning training engine 203 to train the machine learning model 106 that the edge corresponds to a vehicular path.

The negative training set 510 shown in FIG. 5 contains features 410 that have been determined to lack the presence of moving vehicles. The negative training set 510 is also a combined image from images taken at a distinct time. The negative training set 510 includes three unlabeled pixel blobs 511, 512, and 513, as well as two unlabeled edges 514 and 515. In one example, pixel blob 511 corresponds to the green spectral band and pixel blob 512 corresponds to the red spectral band. Pixel blob 513 may correspond to the blue spectral band. Pixel blob 511 is located in a background region 516 that is not between the two edges 514 and 515 and does not correspond to a moving vehicle. Pixel blob 511 is not labeled as a moving vehicle.

Pixel blob 512 is located between the unlabeled pair of edges 514 and 515. In addition, while pixel blob 512 corresponds to the red spectral band, there is no corresponding pixel blob from another spectral band present between the unlabeled pair of edges 514 and 515. Therefore, pixel blob 512 does not correspond to a moving vehicle. Pixel blob 512 is not labeled as a moving vehicle. Pixel blob 513 is located in a background region 517 that is not between the two edges 514 and 515 and does not correspond to a moving vehicle. Pixel blob 513 is not labeled as a moving vehicle. The negative training set 510 is used by the machine learning training engine 203 to train the machine learning model 106 that the three pixel blobs 511, 512, and 513 do not correspond to moving vehicles. The negative training set 510 is further used by the machine learning training engine 203 to train the machine learning model 106 that the edges 514 and 515 do not correspond to a vehicular path.

In an embodiment, the training sets are created by manually labeling pluralities of blobs that represent high scores and pluralities of blobs that represent low scores. In another embodiment, the machine learning training engine 203 extracts training sets from stored images obtained from the image store 102. In one example, if a stored image contains blobs located between a pair of edges corresponding to a vehicular path, the machine learning training engine 203 uses the blobs as a positive training set. If a stored image contains a blob not located between a pair of edges corresponding to a vehicular path, the machine learning training engine 203 uses the blob as a negative training set.

Example Process

Figure 6:
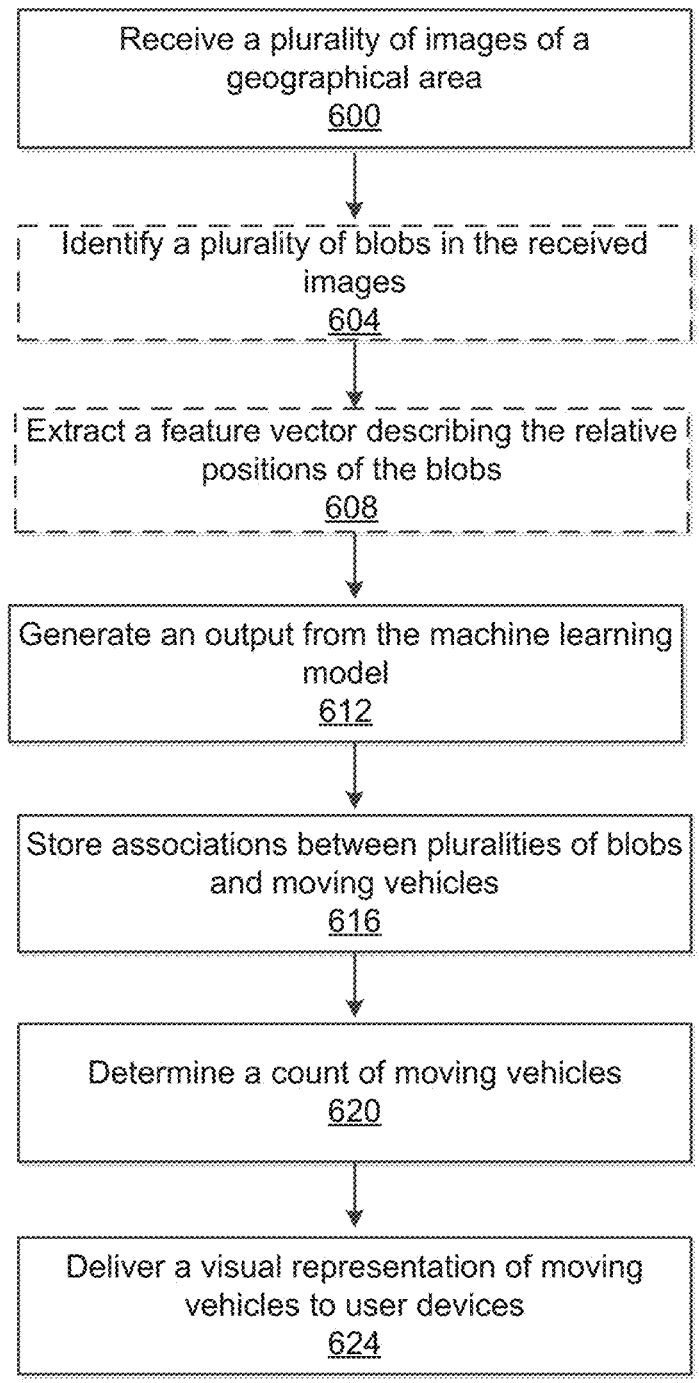
FIG. 6 illustrates an example process for the moving vehicle analysis system for processing low resolution aerial imagery.

FIG. 6 illustrates an example process for the moving vehicle analysis system 101. In some embodiments, the process may have different and/or additional steps than those described in conjunction with FIG. 6. For example, optional steps are shown using dashed lines in FIG. 6. Steps of the process may be performed in different orders than the order described in conjunction with FIG. 6. Some steps may be executed in parallel. Alternatively, some of the steps may be executed in parallel and some steps executed sequentially. Alternatively, some steps may execute in a pipelined fashion such that execution of a step is started before the execution of a previous step.

The moving vehicle analysis system 101 receives 600 images of a geographical area taken at distinct times from an aerial imaging device 110 and stores the images in an image store 102 as illustrated and described above in detail with reference to FIG. 2. An example image of a geographical area received from an aerial imaging device 110 is illustrated and described below in detail with reference to FIG. 8.

In one example embodiment, the pixel blob identification module 103 may perform pixel clustering according to one of the methods described in FIG. 2 to identify 604 blobs in the received images, where each blob includes adjacent pixels matching each other based on a pixel attribute. The feature extraction module 104 may extract 608 a feature vector 410 from the images as illustrated and described above in detail with reference to FIG. 4. The feature vector 410 includes at least a feature describing a relative position of a blob.

The moving vehicle analysis system 101 may transmit the feature vector 410 as input to the machine learning model 106. The feature vector 410 may be physically transmitted as a digital bit stream or a digitized analog signal over a point-to-point or point-to-multipoint communication channel, e.g., copper wires, optical fibers, wireless communication channels, storage media and computer buses. The feature vector 410 may be represented as an electromagnetic signal, such as an electrical voltage, radiowave, microwave, or infrared signal.

In one embodiment, the machine learning model 106 generate 612 an output, based on the feature vector 410, including blobs (each blob corresponding to a distinct image) and a score indicative of a likelihood that the blobs correspond to a moving vehicle. In another embodiment, in which the machine learning model 106 is a CNN, the machine learning model 106 generate 612 an output, based on the images, including blobs and a score indicative of a likelihood that the blobs correspond to a moving vehicle. Based on the generated score exceeding a threshold, the moving vehicle analysis system 101 stores 616 an association between blobs and a moving vehicle. The association between blobs and a moving vehicle may be stored as a database, a lookup table, or a list of data pointers, etc., that is stored in static program storage, pre-fetched by the moving vehicle analysis system 101, or stored in hardware on an application-specific platform. The moving vehicle analysis system 101 determines 620 a count of the number of moving vehicles in the images, where each moving vehicle is associated with corresponding blobs.

Example Application of the Process

Figure 7:
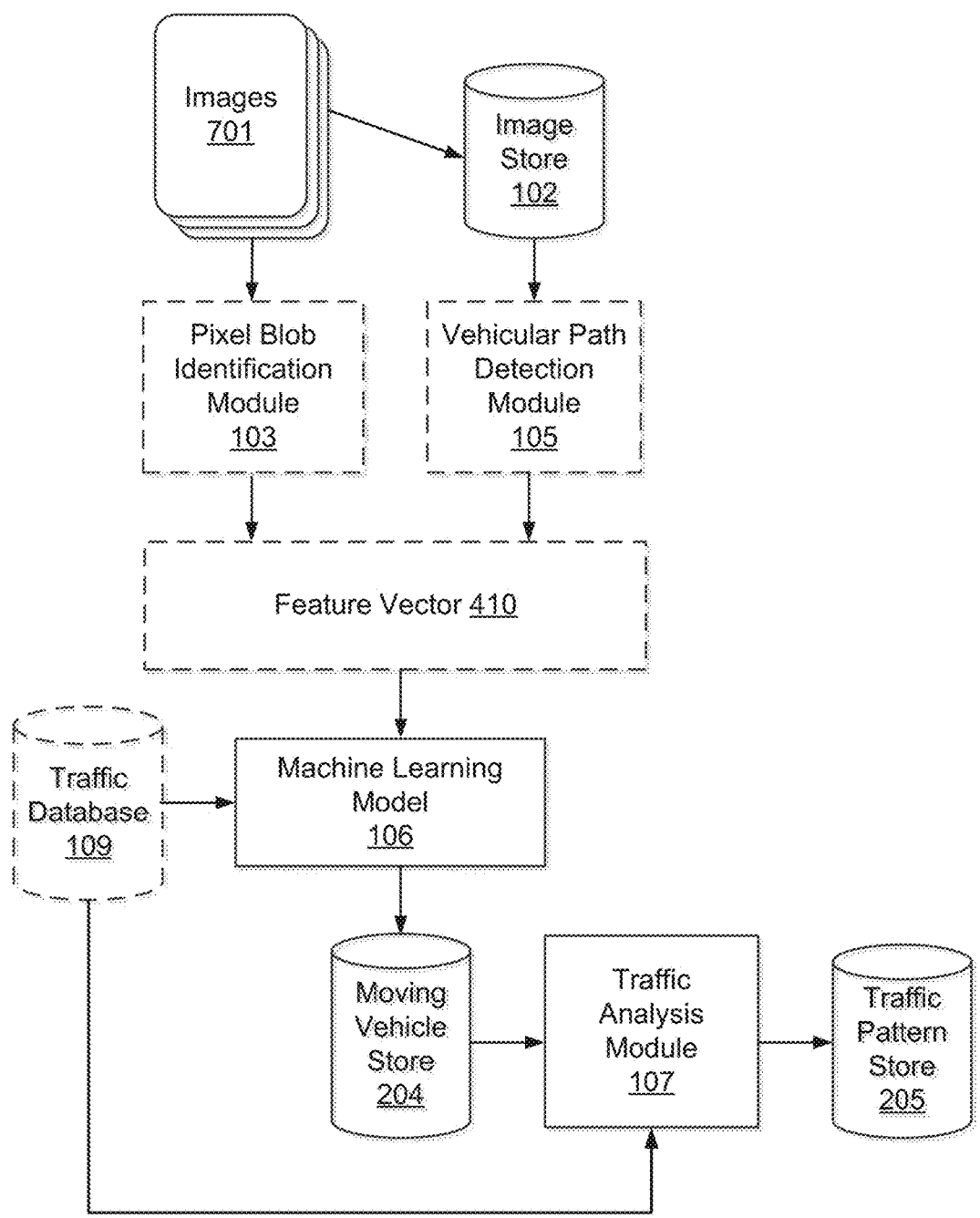
FIG. 7 illustrates an example application of the process for the moving vehicle analysis system to process low resolution aerial imagery.

FIG. 7 illustrates an example application of the process illustrated and described above in detail with reference to FIG. 6 for the moving vehicle analysis system 101 for processing low resolution aerial imagery. The process may involve images 701, an optional pixel blob identification module 103, an image store 102, a vehicular path detection module 105, a feature vector 410, a machine learning model 106, a moving vehicle store 204, a traffic analysis module 107, a traffic database 109 and a traffic pattern store 205. Optional elements are shown using dashed lines in FIG. 7. The moving vehicle analysis system 101 receives images 701 of a geographical area via an external system interface 201, each image 701 captured at a distinct time. The images 701 may correspond to one or more spectral bands. The received images 701 shown in FIG. 7 are stored in the image store 102, as described above in detail with reference to FIG. 2.

In one embodiment, the pixel blob identification module 103 shown in FIG. 7 performs pixel clustering as described in FIG. 2 to identify pixel blobs, each blob comprising adjacent pixels, wherein the adjacent pixels match each other based on a pixel attribute, such as color or brightness. The vehicular path detection module 105 performs edge analysis, as described, in the images to identify pairs of edges, the pairs of edges corresponding to vehicular paths. The moving vehicle analysis system 101 extracts a feature vector 410 from the images to be used by a machine learning model 106. In one embodiment described in FIG. 4, the features describe the relative positions of blobs with respect to vehicular paths and with respect to other blobs. In another embodiment described in FIG. 4, the feature vector 410 describes the brightness of a pixel relative to the average brightness of other pixels located on the same row in an image.

The moving vehicle analysis system 101 transmits the extracted feature vector 410 to a machine learning model. In one embodiment, the machine learning model is a machine learning model 106 shown in FIG. 7. In one example embodiment, the machine learning model 106 may generate a score indicative of a likelihood that pixel blobs corresponds to a moving vehicle. In another embodiment in which the machine learning model 106 is a CNN, the score is indicative of a likelihood that a pixel in an image 701 corresponds to a blob representing a moving vehicle. In this embodiment, the machine learning model 106 is configured to optimize the conditional probability that a pixel in an image 701 corresponds to a blob representing a moving vehicle based on the pixel's location and brightness in the image 701. In one example, P(blob(e)) represents the probability that a pixel having a brightness attribute e corresponds to a blob. In this example, P(vehicle(i, j)) represents the probability that a pixel location (i, j) within image 701 corresponds to a moving vehicle. The machine learning model 106 is configured to optimize the sum $\Sigma_i \Sigma_j \Sigma_e P$(vehicle(i, j)|blob(e)), which represents the sum of conditional probabilities over all pixel locations (i, j) in image 701 and all values of pixel brightness e that a pixel location (i, j) within image 701 corresponds to a moving vehicle, given that the pixel has a brightness attribute e.

The traffic analysis module 107 shown in FIG. 7 may determine a count of one or more moving vehicles in the images, each moving vehicle associated with corresponding blobs, and stores information about the identified moving vehicles in the moving vehicle store 204 as described above in detail with reference to FIG. 2. The traffic analysis module 107 may use information from the traffic database 109 such as intersection counts (directional volume of traffic as it moves through a signalized or unsignalized intersection, the number of left-turn, right-turn, U-turn and through movements, etc.), roundabout counts (the turning movement volume of roundabouts, the entry, circulating and exit flow rate for each roundabout leg, etc.), road volume data (vehicle volume, vehicle classification, lane-by-lane classifications and volumes, etc.), vehicle gap data (the number of gaps in seconds that exist between vehicles in the major traffic stream at specific reference points), etc., to compare with positions of identified moving vehicles and create accurate routing, estimated time of arrival, etc.

Example Image of a Geographical Area

Figure 8:
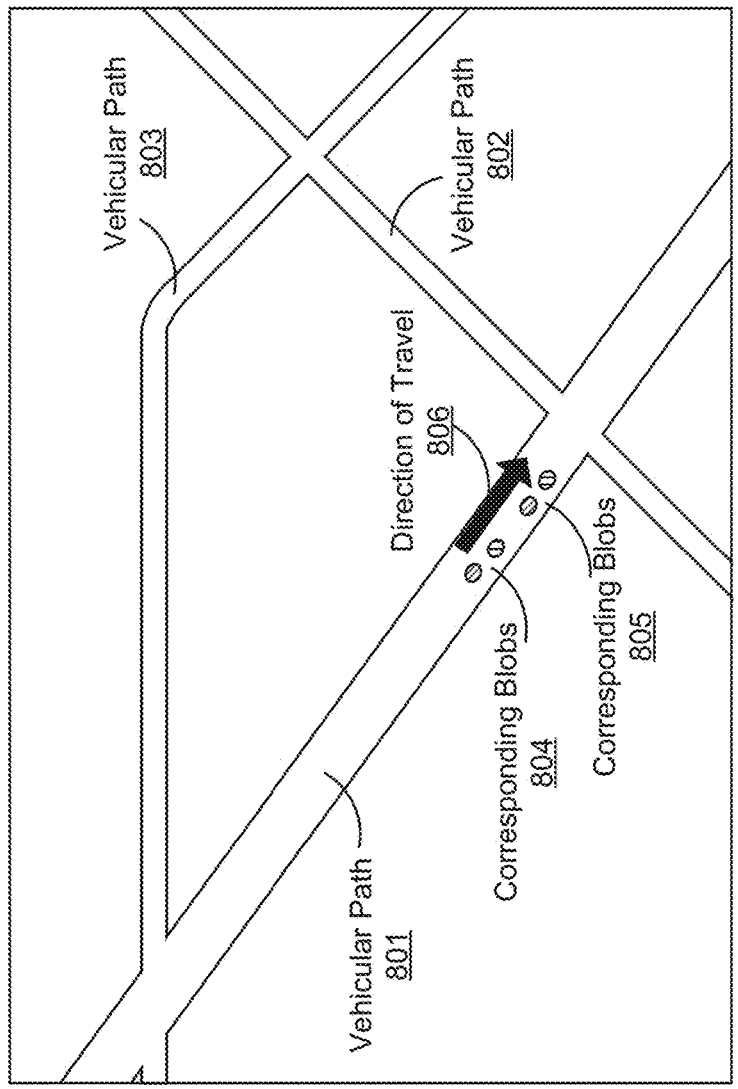
FIG. 8 illustrates an example low resolution aerial image of a geographical area taken from multiple imaging sensors.

FIG. 8 is an example low resolution aerial image 800 of a geographical area combined from multiple imaging sensors within the aerial imaging device 110, as described above in detail with reference to FIG. 1. Image 800 is received by the moving vehicle analysis system 101, as described above in detail with reference to FIG. 2. The multiple imaging sensors within the aerial imaging device 110 correspond to different spectral bands and capture images at distinct times, as described above in detail with reference to FIG. 1. Vehicular paths 801, 802, and 803 detected by the vehicular path detection module 105 or the machine learning model 106 (in the form of a CNN) are visible in the image 800. Blobs 804 on vehicular path 801 correspond to a moving vehicle as identified by the machine learning model 106. Blobs 805 on vehicular path 801 correspond to another moving vehicle as identified by the machine learning model 106. The direction of travel 806 corresponds to the direction from the green to the red blobs within corresponding blobs 804 and 805 because the green spectral band image is captured before the red spectral band image.

Example Image Containing Pixel Blobs

Figure 9:
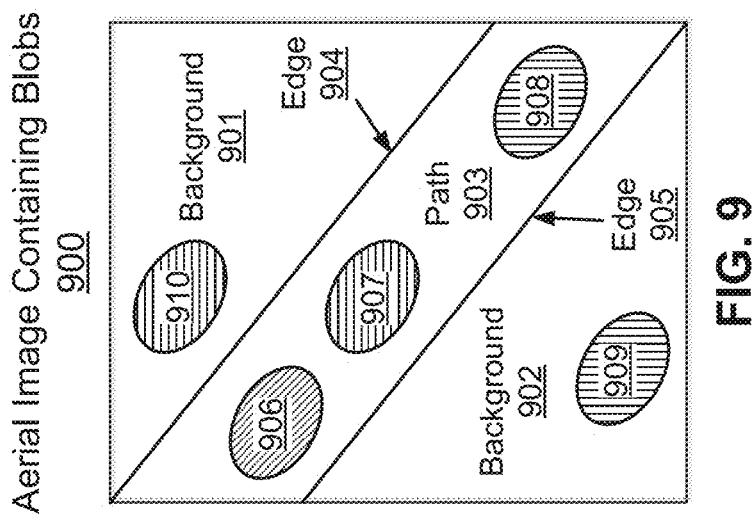
FIG. 9 illustrates an example low resolution aerial image containing pixel blobs.

FIG. 9 illustrates an example low resolution aerial image 900 combined from multiple imaging sensors and containing pixel blobs and vehicular paths identified by the moving vehicle analysis system 101, as described above in detail with reference to FIG. 2. In image 900, the moving vehicle analysis system 101 has identified background regions 901 and 902 containing no edges corresponding to vehicular paths. The pixel blobs 910 and 909 shown in FIG. 9 have been identified as described above in detail with reference to FIG. 2. The pixel blobs 910 and 909 are located in background regions 901 and 902 containing no edges and therefore are not identified as corresponding to moving vehicles, as described above in detail with reference to FIG. 7.

In image 900, the moving vehicle analysis system 101 has also identified edges 904 and 905 corresponding to a vehicular path 903, as described above in detail with reference to FIG. 2. Only blobs located between the edges 904 and 905 may correspond to moving vehicles. The pixel blobs 906, 907, and 908 shown in FIG. 9 have been identified. The pixel blobs 906, 907, and 908 correspond to images taken at distinct times and are located between the edges 904 and 905 corresponding to the vehicular path 903. Therefore, the pixel blobs 906, 907, and 908 may be identified as corresponding to moving vehicles by the application of the process described above in detail with reference to FIG. 7.

Example Output of Traffic Analysis

Figure 10:
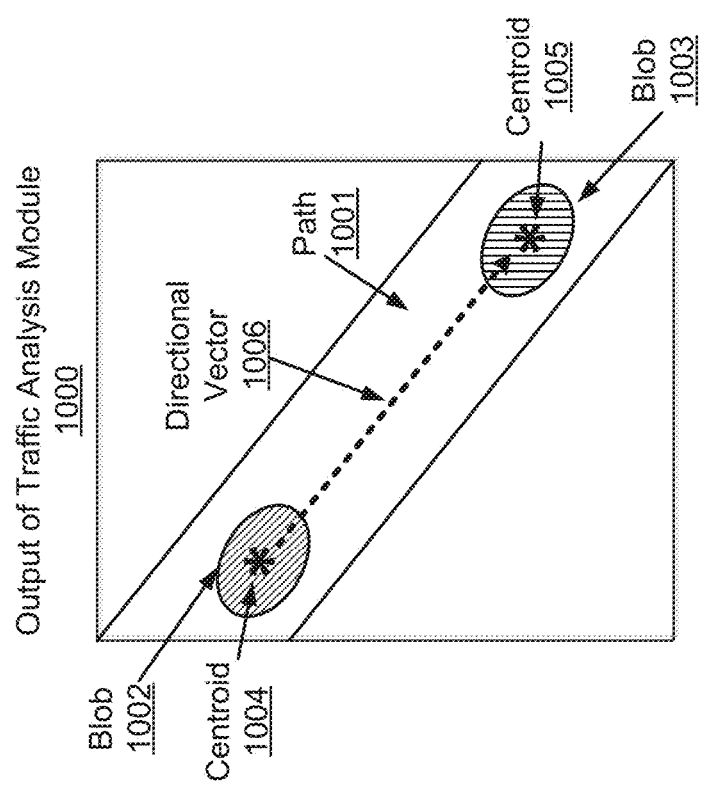
FIG. 10 illustrates an example output of a traffic analysis module.

FIG. 10 illustrates an example output 1000 of the traffic analysis module 107. The image illustrated in FIG. 10 contains a vehicular path 1001 and two pixel blobs 1002 and 1003 that correspond to a moving vehicle identified by the application of the process described above with reference to FIG. 7. The traffic analysis module 107 determines a directional vector for the blobs corresponding to each moving vehicle by determining a difference between a centroid of each of the corresponding blobs. As described above in detail with reference to FIG. 2, in the example output 1000 of the traffic analysis module 107 shown in FIG. 10, the traffic analysis module 107 has determined the centroid 1004 of the blob 1002 as the arithmetic mean location of all the pixel locations in the blob 1002 as $\Sigma_{ij}(i, j)/m$, where (i, j) represents the pixel location of a pixel in the blob 1002 and m represents the number of pixels in the blob 1002.

Further, in the example output 1000, the traffic analysis module 107 has determined the centroid 1005 of the blob 1003 as the arithmetic mean location of all the pixel locations in the blob 1003 as $\Sigma_{pq}(p, q)/s$, where (p, q) represents the pixel location of a pixel in the blob 1003 and s represents the number of pixels in the blob 1003. In example output 1000, the traffic analysis module 107 has determined the directional vector 1006 of the moving vehicle as $\Sigma_{ij}(i, j)/m - \Sigma_{pq}(i, j)/s$. The directional vector corresponds to a speed and a direction of the moving vehicle.

Example Input Images from a Single Imaging Sensor

FIG. 11 illustrates example low resolution aerial images 1100 and 1110, each captured from a single imaging sensor at distinct times $t_1$ and $t_2$, where $t_1$ is earlier than $t_2$ in time. The images 1100 and 1110 are received as input by the moving vehicle analysis system 101. In one example the image 1100 captured at time $t_1$ corresponds to the green spectral band. In this example, the image 1110 captured at time $t_2$ corresponds to the red spectral band. The image 1100 includes a vehicular path 1101 and two edges 1102 and 1103 corresponding to the vehicular path 1101. The image 1100 further includes two pixel blobs 1104 and 1105 corresponding to the green spectral band. Both blobs 1104 and 1105 are located between the pair of edges 1102 and 1103 corresponding to the vehicular path 1101. Pixel blob 1104 is located closer to edge 1102 than to edge 1103, and blob 1105 is located closer to edge 1103 than to edge 1102.

The image 1110 shown in FIG. 11 also includes the vehicular path 1101 and the two edges 1102 and 1103 corresponding to the vehicular path 1101. The image 1110 further includes two pixel blobs 1114 and 1115 corresponding to the red spectral band. Both blobs 1114 and 1115 are located between the pair of edges 1102 and 1103 corresponding to the vehicular path 1101. Pixel blob 1114 is located closer to edge 1102 than to edge 1103, and blob 1115 is located closer to edge 1103 than to edge 1102. Because image 1100 is captured at time $t_1$ which is earlier than the time $t_2$ at which image 1110 is captured, the blobs 1104 and 1105 represent positions of moving vehicles earlier in time. Because image 1110 is captured at time $t_2$ which is later than the time $t_1$ at which image 1100 is captured, the blobs 1114 and 1115 represent positions of moving vehicles later in time.

Example Output of a Machine Learning Model

FIG. 12A illustrates an example output 1200 of the machine learning model 106 for the received images 1100 and 1110 shown in FIG. 11 according to the process of FIG. 6. The output 1200 of the machine learning model 106 includes the identified vehicular path 1101 shown in FIG. 12A. The output 1200 of the machine learning model 106 further includes the blobs 1104 and 1114 from images 1100 and 1110 located within the edges corresponding to vehicular path 1101. Because blob 1104 corresponds to the green spectral band and blob 1114 corresponds to the red spectral band, the machine learning model 106 has identified that blobs 1104 and 1114 from images 1100 and 1110 correspond to a moving vehicle 1204 driving closer to the upper edge of vehicular path 1101.

The output 1200 of the machine learning model 106 further includes the blobs 1105 and 1115 from images 1100 and 1110 located between the pair of edges corresponding to vehicular path 1101 shown in FIG. 12A. Because blob 1105 corresponds to the green spectral band and blob 1115 corresponds to the red spectral band, the machine learning model 106 has identified that blobs 1105 and 1115 from images 1100 and 1110 correspond to a second moving vehicle 1205 driving closer to the lower edge of vehicular path 1101.

Example Output of Traffic Analysis

FIG. 12B illustrates an example output 1210 of a traffic analysis module 107 for the two moving vehicles 1204 and 1205 from FIG. 12A. In FIG. 12B, the traffic analysis module 107 has computed a directional vector 1214 for moving vehicle 1204 from FIG. 12A, as described above in detail with reference to FIG. 2. The moving vehicle 1204 is represented in FIG. 12A by blob 1104 corresponding to the green spectral band captured at time $t_1$ and by blob 1114 corresponding to the red spectral band captured at time $t_2$, where $t_1$ is earlier than $t_2$. Therefore, the traffic analysis module 107 computes the directional vector 1214 shown in FIG. 12B of the moving vehicle 1204 from FIG. 12A as moving in the direction from blob 1104 to blob 1114.

In FIG. 12B, the traffic analysis module 107 has further computed a directional vector 1215 for moving vehicle 1205 from FIG. 12A, as described above in detail with reference to FIG. 2. The moving vehicle 1205 is represented in FIG. 12A by blob 1105 corresponding to the green spectral band captured at time $t_1$ and by blob 1115 corresponding to the red spectral band captured at time $t_2$, where $t_1$ is earlier than $t_2$. Therefore, the traffic analysis module 107 computes the directional vector 1215 shown in FIG. 12B of the moving vehicle 1205 from FIG. 12A as moving in the direction from blob 1105 to blob 1115.

Example Machine Architecture

Figure 13:
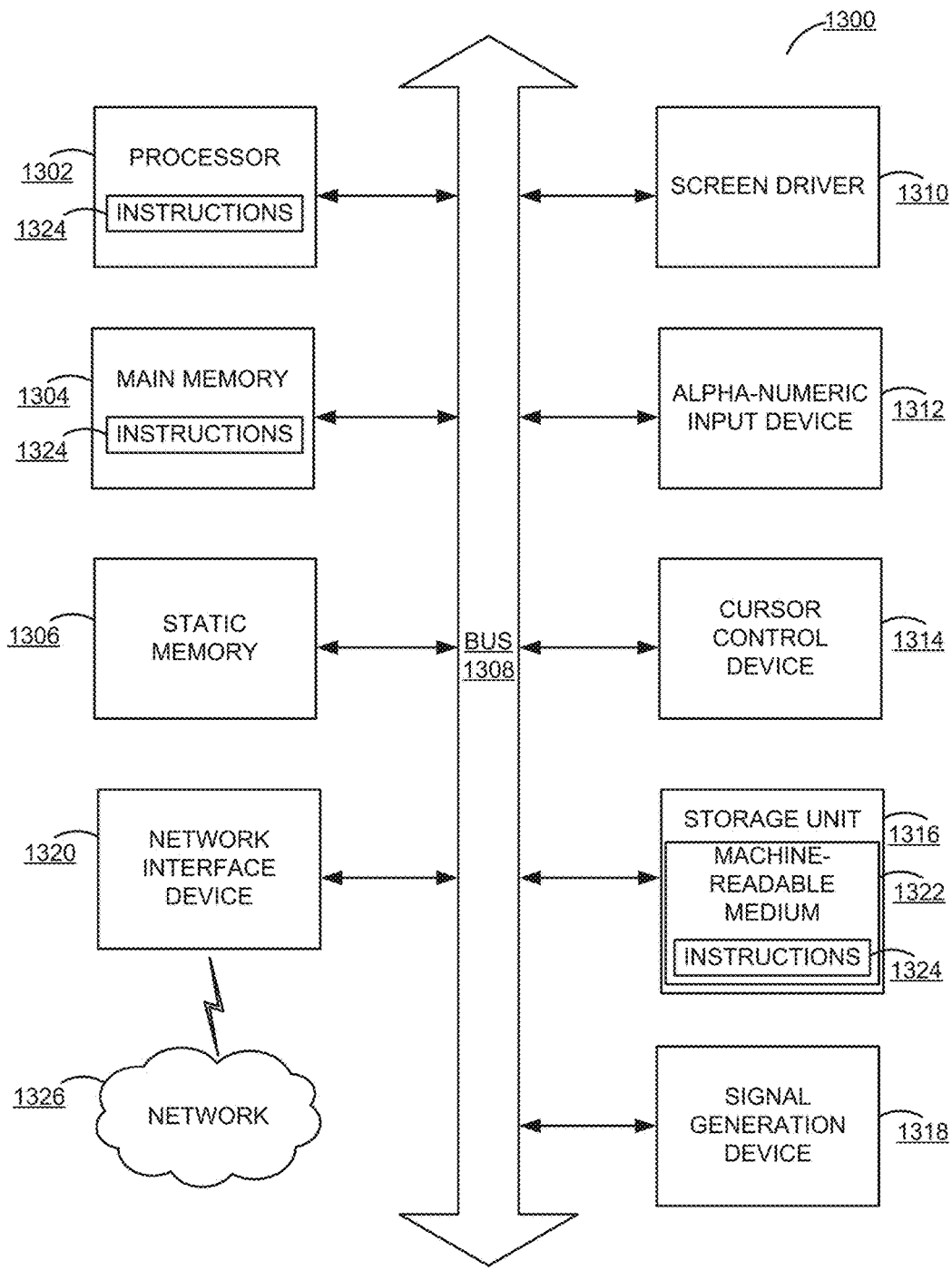
FIG. 13 is a block diagram illustrating components of an example machine able to read instructions from a machine-readable medium and execute them in a processor or controller.

FIG. 13 is a block diagram illustrating components of an example machine able to read instructions described as processes herein from a machine-readable medium and execute them in at least one processor (or controller). Specifically, FIG. 13 shows a diagrammatic representation of a machine in the example form of a computer system 1300. The computer system 1300 can be used to execute instructions 1324 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 1324 (sequential or otherwise) that specify actions to be taken by that machine. Further, while only a single machine is illustrated, the term "machine" shall also be taken to include any collection of machines that individually or jointly execute instructions 1324 to perform any one or more of the methodologies discussed herein.

The example computer system 1300 includes one or more processing units (generally processor 1302). The processor 1302 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 1300 also includes a main memory 1304. The computer system may include a storage unit 1316. The processor 1302, memory 1304 and the storage unit 1316 communicate via a bus 1308.

In addition, the computer system 1300 can include a static memory 1306, a display driver 1310 (e.g., to drive a plasma display panel (PDP), a liquid crystal display (LCD), or a projector). The computer system 1300 may also include alphanumeric input device 1312 (e.g., a keyboard), a cursor control device 1314 (e.g., a mouse, a trackball, a joystick, a motion sensor, or other pointing instrument), a signal generation device 1318 (e.g., a speaker), and a network interface device 1320, which also are configured to communicate via the bus 1308.

The storage unit 1316 includes a machine-readable medium 1322 on which is stored instructions 1324 (e.g., software) embodying any one or more of the methodologies or functions described herein. The instructions 1324 may also reside, completely or at least partially, within the main memory 1304 or within the processor 1302 (e.g., within a processor's cache memory) during execution thereof by the computer system 1300, the main memory 1304 and the processor 1302 also constituting machine-readable media. The instructions 1324 may be transmitted or received over a network 1326 via the network interface device 1320.

While machine-readable medium 1322 is shown in an example embodiment to be a single medium, the term "machine-readable medium" should be taken to include a single medium or multiple media (e.g., a centralized or distributed database, or associated caches and servers) able to store the instructions 1324. The term "machine-readable medium" shall also be taken to include any medium that is capable of storing instructions 1324 for execution by the machine and that cause the machine to perform any one or more of the methodologies disclosed herein. The term "machine-readable medium" includes, but not be limited to, data repositories in the form of solid-state memories, optical media, and magnetic media.

Additional Considerations

The moving vehicle analysis system as disclosed provides benefits and advantages that include the transformation of clusters of pixels into a digital representation of moving vehicles, and for each moving vehicle, the digital representation of the size of the moving vehicle, the speed of the moving vehicle, and the direction of the moving vehicle. Other advantages of the system include faster processing of the aerial images, less power consumption, lower latency in moving vehicle detection, less data transmitted over the network, etc.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated and described with FIGS. 1, 2, 4, 6, 7, and 13. Modules may constitute either software modules (e.g., code embodied on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may include dedicated circuitry or logic that is permanently configured (e.g., as a special-purpose processor, such as a field programmable gate array (FPGA) or an application-specific integrated circuit (ASIC)) to perform certain operations. A hardware module may also include programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 1302, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, include processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that includes a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the claimed invention. This description should be read to include one or at least one and the singular also includes the plural unless it is obvious that it is meant otherwise.

Upon reading this disclosure, those of skill in the art will appreciate still additional alternative structural and functional designs for a system and a process for identifying moving vehicles from low resolution imagery through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for processing images from an aerial imaging device, the method comprising:
   receiving a plurality of images of a geographical area, each image of the plurality of images captured at a distinct time;
   generating, by a machine learning model based on the plurality of images, an output comprising:
   a plurality of blobs, wherein each blob comprises one or more adjacent pixels in a distinct image of the plurality of images, the adjacent pixels matching each other based on a pixel attribute;
   a score indicative of a likelihood that the plurality of blobs corresponds to a moving vehicle;
   storing an association between the plurality of blobs and the moving vehicle responsive to the generated score exceeding a threshold;
   determining a count of one or more moving vehicles in the plurality of images, each moving vehicle associated with a corresponding plurality of blobs
   receiving a pixel resolution of the plurality of images;
   determining a number of pixels in each blob of the plurality of blobs;
   determining a size of each vehicle of the one or more moving vehicles based on the pixel resolution and the number of pixels in each blob of the corresponding plurality of blobs associated with the moving vehicle;
   determining a number of pixels associated with a length of a vehicular path;
   determining the length of the vehicular path based on the pixel resolution and the number of pixels associated with the length of the vehicular path;
   for each of the one or more moving vehicles, determining a directional vector for the corresponding plurality of blobs associated with the moving vehicle by determining a difference between a centroid of each blob of the corresponding plurality of blobs, the directional vector corresponding to a speed and a direction of the moving vehicle;
   for each of the one or more moving vehicles, determining a length of the directional vector based on the pixel resolution; and
   for each of the one or more moving vehicles, determining a speed as the length of the directional vector divided by a difference in time between the plurality of images.

2. The method of claim 1, wherein each image of the plurality of images corresponds to a spectral band, wherein a spectral band corresponds to a range of wavelengths of light.

3. The method of claim 1, further comprising:
   for each image of the plurality of images, performing pixel clustering to identify a blob.

4. The method of claim 1, wherein the output further comprises at least one of:
   one or more pixels locations corresponding to a blob and a score indicative of a likelihood that the one or more pixels locations correspond to a blob;
   a plurality of pixel locations corresponding to a vehicular path and a score indicative of a likelihood that the plurality of pixel locations correspond to a vehicular path;
   a number of pixels in each blob of the plurality of blobs; or
   an association between the plurality of blobs and a moving vehicle.

5. The method of claim 1, further comprising:
   receiving a plurality of training sets, each training set comprising a labeled plurality of blobs corresponding to a moving vehicle; and
   training the machine learning model using the training sets, the machine learning model configured to generate an output comprising a plurality of blobs and a score indicative of a likelihood that the plurality of blobs corresponds to a moving vehicle.

6. The method of claim 1, further comprising:
   determining a density of moving vehicles based on the count of the one or more moving vehicles and the length of the vehicular path.

7. The method of claim 1, further comprising:
for each of the one or more moving vehicles, determining a speed as the length of the directional vector divided by a difference in time between the plurality of images.

8. The method of claim 7, further comprising:
determining an average speed as the sum of the speeds of the one or more moving vehicles divided by the count of the one or more moving vehicles.

9. The method of claim 8, further comprising:
analyzing a traffic pattern comprising at least one of:
a time of capture of an image of the plurality of images;
the count of the one or more moving vehicles;
the size of each vehicle of the one or more moving vehicles;
the average speed;
the density of moving vehicles; or
the length of the vehicular path; and
sending re-routing information to the one or more moving vehicles responsive to the analyzed traffic pattern exceeding a threshold.

10. The method of claim 1, further comprising:
performing edge analysis in an image of the plurality of images to identify a pair of edges, the pair of edges corresponding to a vehicular path.

11. The method of claim 10, further comprising:
extracting a feature vector from the plurality of images, the feature vector comprising at least a feature representing whether a blob is located between the pair of edges corresponding to the vehicular path.

12. The method of claim 11, wherein a feature represents whether two blobs intersect each other.

13. The method of claim 11, wherein a feature represents whether a difference between a centroid of each blob of the plurality of blobs matches a labeled direction of the vehicular path.

14. The method of claim 11, wherein a feature represents an association between a plurality of pixel locations and the pixel attribute.

15. A non-transitory computer-readable storage medium comprising instructions executable by a processor, the instructions when executed by the processor causes the processor to:
receive a plurality of images of a geographical area, each image of the plurality of images captured at a distinct time;
generate, by a machine learning model based on the plurality of images, an output comprising:
a plurality of blobs, wherein each blob comprises one or more adjacent pixels in a distinct image of the plurality of images, the adjacent pixels matching each other based on a pixel attribute; and
a score indicative of a likelihood that the plurality of blobs corresponds to a moving vehicle;
store an association between the plurality of blobs and the moving vehicle responsive to the generated score exceeding a threshold;
determine a count of one or more moving vehicles in the plurality of images, each moving vehicle associated with a corresponding plurality of blobs;
receive a pixel resolution of the plurality of images;
determine a number of pixels in each blob of the plurality of blobs;
determine a size of each vehicle of the one or more moving vehicles based on the pixel resolution and the number of pixels in each blob of the corresponding plurality of blobs associated with the moving vehicle;
determine a number of pixels associated with a length of a vehicular path;
determine the length of the vehicular path based on the pixel resolution and the number of pixels associated with the length of the vehicular path;
for each of the one or more moving vehicles, determine a directional vector for the corresponding plurality of blobs associated with the moving vehicle by determining a difference between a centroid of each blob of the corresponding plurality of blobs, the directional vector corresponding to a speed and a direction of the moving vehicle;
for each of the one or more moving vehicles, determine a length of the directional vector based on the pixel resolution; and
for each of the one or more moving vehicles, determine a speed as the length of the directional vector divided by a difference in time between the plurality of images.

16. The non-transitory computer-readable storage medium of claim 15, wherein each image of the plurality of images corresponds to a spectral band, wherein a spectral band corresponds to a range of wavelengths of light.

17. The non-transitory computer-readable storage medium of claim 15, comprising further instructions that when executed by the processor causes the processor to:
for each image of the plurality of images, perform pixel clustering to identify a blob.

18. The non-transitory computer-readable storage medium of claim 15, wherein the output further comprises at least one of:
one or more pixels locations corresponding to a blob and a score indicative of a likelihood that the one or more pixels locations correspond to a blob;
a plurality of pixel locations corresponding to a vehicular path and a score indicative of a likelihood that the plurality of pixel locations correspond to a vehicular path;
a number of pixels in each blob of the plurality of blobs; or
an association between the plurality of blobs and a moving vehicle.

19. The non-transitory computer-readable storage medium of claim 15, comprising further instructions that when executed by the processor causes the processor to:
receive a plurality of training sets, each training set comprising a labeled plurality of blobs corresponding to a moving vehicle; and
train the machine learning model using the training sets, the machine learning model configured to generate an output comprising a plurality of blobs and a score indicative of a likelihood that the plurality of blobs corresponds to a moving vehicle.

20. A system, comprising:
a processor;
a non-transitory computer-readable storage medium comprising computer-readable instructions, that when executed by the processor, cause the processor to:
receive a plurality of images of a geographical area, each image of the plurality of images captured at a distinct time;
generate, by a machine learning model based on the plurality of images, an output comprising:
a plurality of blobs, wherein each blob comprises one or more adjacent pixels in a distinct image of the plurality of images, the adjacent pixels matching each other based on a pixel attribute; and a score indicative of a likelihood that the plurality of blobs corresponds to a moving vehicle;

store an association between the plurality of blobs and the moving vehicle responsive to the generated score exceeding a threshold;

determine a count of one or more moving vehicles in the plurality of images, each moving vehicle associated with a corresponding plurality of blobs;

receive a pixel resolution of the plurality of images;

determine a number of pixels in each blob of the plurality of blobs;

determine a size of each vehicle of the one or more moving vehicles based on the pixel resolution and the number of pixels in each blob of the corresponding plurality of blobs associated with the moving vehicle;

determine a number of pixels associated with a length of a vehicular path;

determine the length of the vehicular path based on the pixel resolution and the number of pixels associated with the length of the vehicular path;

for each of the one or more moving vehicles, determine a directional vector for the corresponding plurality of blobs associated with the moving vehicle by determining a difference between a centroid of each blob of the corresponding plurality of blobs, the directional vector corresponding to a speed and a direction of the moving vehicle;

for each of the one or more moving vehicles, determine a length of the directional vector based on the pixel resolution; and for each of the one or more moving vehicles, determine a speed as the length of the directional vector divided by a difference in time between the plurality of images.

* * * * *